(12) United States Patent
Ogasawara et al.

(10) Patent No.: US 7,574,575 B2
(45) Date of Patent: Aug. 11, 2009

(54) DISK ARRAY DEVICE INCLUDING A SYSTEM LU FOR STORING CONTROL INFORMATION IN THE DISK ARRAY AND BACKUP LU FOR BACKING UP THE CONTROL INFORMATION AND CONTROLLING METHOD THEREOF

(75) Inventors: Hiroshi Ogasawara, Odawara (JP); Yoshinori Igarashi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 102 days.

(21) Appl. No.: 11/634,090

(22) Filed: Dec. 6, 2006

(65) Prior Publication Data

US 2007/0079069 A1    Apr. 5, 2007

Related U.S. Application Data

(63) Continuation of application No. 10/911,604, filed on Aug. 5, 2004, now Pat. No. 7,149,861.

(30) Foreign Application Priority Data

May 27, 2004    (JP)    ............................... 2004-157348

(51) Int. Cl.
  G06F 12/00    (2006.01)
  G06F 12/16    (2006.01)
(52) U.S. Cl. ....................................... 711/162; 711/173
(58) Field of Classification Search ................. 711/162, 711/112, 170, 173
See application file for complete search history.

(56) References Cited

U.S. PATENT DOCUMENTS 6,343,324 B1    1/2002   Hubis et al.
6,633,962 B1   10/2003   Burton et al.
6,662,284 B2   12/2003   Gold (Continued)

FOREIGN PATENT DOCUMENTS

EP    1276034    1/2003

(Continued)

OTHER PUBLICATIONS

H. Yoshida, "LUN Security Considerations for Storage Area Networks", Hitachi Data Systems, 1999, pp. 1-7.

*Primary Examiner*—Shane M Thomas
(74) *Attorney, Agent, or Firm*—Antonelli, Terry, Stout & Kraus, LLP.

(57) ABSTRACT

The present invention provides a storage unit system that can be connected to a plurality of different kinds of networks and a controlling method for a system LU of a storage device control unit required in such a storage unit system. In the storage unit system, to an LDEV of a storage device, it is possible to set a system LU for storing control information in the storage unit system itself and a user LU for writing write data sent from a host device, while a management terminal specifies a system LU or a user LU to set a path definition to the LDEV and a CHN inhibits an access to the system LU from the host device in accordance with distinction specified by the management terminal. Furthermore, a path of the system LU is automatically defined to a backup LU, so that the control information stored in the system LU is backed up to the backup LU.

20 Claims, 27 Drawing Sheets

| LUN# | Contents | LDEV Minimum Capacity |
|---|---|---|
| 00 | OS Storing LU | 200MB |
| 01 | Dump Pick – up LU | 100MB |
| 05 | Command Device LU | 50MB |
| 06 | Fault Information Storing LU | 70MB |
| 08 | Cluster – shared Information Storing LU | 60MB |
| 09 | Backup LU of OS Storing LU | 200MB |
| 0A | Backup LU of Cluster – shared Information Storing LU | 60MB |
| 4B | Backup LU of Dump Pick – up LU | 100MB |
| 4C | Backup LU of Command Device LU | 50MB |
| 4D | Backup LU of Fault Information Storing LU | 70MB |

U.S. PATENT DOCUMENTS

| | | |
|---|---|---|
| 6,754,767 B2 | 6/2004 | Gold |
| 7,007,042 B2 * | 2/2006 | Lubbers et al. ............. 707/202 |
| 7,149,861 B2 * | 12/2006 | Ogasawara et al. ......... 711/162 |
| 2002/0049886 A1 | 4/2002 | Furuya et al. |
| 2002/0178143 A1 | 11/2002 | Fujimoto |
| 2003/0115433 A1 * | 6/2003 | Kodama ..................... 711/162 |
| 2004/0139168 A1 | 7/2004 | Tanaka et al. |
| 2004/0170046 A1 | 9/2004 | Belnet et al. |
| 2005/0210191 A1 | 9/2005 | Kobayashi et al. |
| 2006/0253724 A1 * | 11/2006 | Zhang .......................... 714/2 |

FOREIGN PATENT DOCUMENTS

| | | |
|---|---|---|
| JP | 2002-351703 | 12/2002 |

* cited by examiner

Physical Disk Management Table

| Disk No. | Capacity | RAID | Busy Condition |
|---|---|---|---|
| #001 | 100GB | 5 | Busy |
| #002 | 100GB | 5 | Busy |
| #003 | 100GB | 5 | Busy |
| #004 | 100GB | 5 | Busy |
| #005 | 100GB | 5 | Busy |
| #006 | 50GB | — | Unbusy |
| ⋮ | ⋮ | ⋮ | ⋮ |

LU Management Table

| LU No. | Physical Disk | Capacity | RAID |
|---|---|---|---|
| #1 | #001,#002,#003,#004,#005 | 100GB | 5 |
| #2 | #001,#002,#003,#004,#005 | 300GB | 5 |
| #3 | #006,#007 | 200GB | 1 |
| ⋮ | ⋮ | ⋮ | ⋮ |

730
Meta Data

| File Name | Leading Address | Capacity | Owner | Updating Time |
|---|---|---|---|---|
| A | 7BSA | 200MB | X | 0:00 |
| B | 05BF | 50MB | X | 7:57 |
| C | 1F30 | 100MB | Y | 9:15 |
| D | 470B | 100MB | Z | 15:20 |
| ⋮ | ⋮ | ⋮ | ⋮ | ⋮ |

721 File Lock Table

| File Name | Lock Condition |
|---|---|
| A | On |
| B | — |
| C | — |
| D | On |
| ⋮ | ⋮ |

722 LU Lock Table

| LU | Lock Condition |
|---|---|
| Sharing | — |
| 1 | On |
| 2 | — |
| ⋮ | ⋮ |

FIG. 12

| LUN# | Contents | LDEV Minimum Capacity |
|---|---|---|
| 00 | OS Storing LU | 200MB |
| 01 | Dump Pick – up LU | 100MB |
| 05 | Command Device LU | 50MB |
| 06 | Fault Information Storing LU | 70MB |
| 08 | Cluster – shared Information Storing LU | 60MB |
| 09 | Backup LU of OS Storing LU | 200MB |
| 0A | Backup LU of Cluster – shared Information Storing LU | 60MB |
| 4B | Backup LU of Dump Pick – up LU | 100MB |
| 4C | Backup LU of Command Device LU | 50MB |
| 4D | Backup LU of Fault Information Storing LU | 70MB |

FIG. 19

| LUN# | Contents | LDEV Minimum Capacity |
|---|---|---|
| 00 | OS Storing LU | 200MB |
| 01 | Dump Pick – up LU | 100MB |
| 05 | Command Device LU | 50MB |
| 06 | Fault Information Storing LU | 70MB |
| 08 | Cluster – shared Information Storing LU | 60MB |
| 09 | Backup LU of OS Storing LU | 200MB |
| 0A | Backup LU of Cluster – shared Information Storing LU | 60MB |
| 4B | Backup LU of Dump Pick – up LU | 100MB |
| 4C | Backup LU of Command Device LU | 50MB |
| 4D | Backup LU of Fault Information Storing LU | 70MB |
| 0B | Automatically added and deleted depending on whether LU# 00 of CHN1 exists(For storing OS) | 200MB |
| 0C | Automatically added and deleted depending on whether LU# 00 of CHN2 exists(For storing OS) | 200MB |
| 0D | Automatically added and deleted depending on whether LU# 00 of CHN3 exists(For storing OS) | 200MB |
| 0E | Automatically added and deleted depending on whether LU# 00 of CHN4 exists(For storing OS) | 200MB |
| 0F | Automatically added and deleted depending on whether LU# 00 of CHN5 exists(For storing OS) | 200MB |
| 10 | Automatically added and deleted depending on whether LU# 00 of CHN6 exists(For storing OS) | 200MB |
| 11 | Automatically added and deleted depending on whether LU# 00 of CHN7 exists(For storing OS) | 200MB |
| 12 | Automatically added and deleted depending on whether LU# 00 of CHN8 exists(For storing OS) | 200MB |
| 1B | Automatically added and deleted depending on whether LU# 01 of CHN1 exists(For Dump) | 100MB |
| 1C | Automatically added and deleted depending on whether LU# 01 of CHN2 exists(For Dump) | 100MB |
| 1D | Automatically added and deleted depending on whether LU# 01 of CHN3 exists(For Dump) | 100MB |
| 1E | Automatically added and deleted depending on whether LU# 01 of CHN4 exists(For Dump) | 100MB |
| 1F | Automatically added and deleted depending on whether LU# 01 of CHN5 exists(For Dump) | 100MB |
| 20 | Automatically added and deleted depending on whether LU# 01 of CHN6 exists(For Dump) | 100MB |
| 21 | Automatically added and deleted depending on whether LU# 01 of CHN7 exists(For Dump) | 100MB |
| 22 | Automatically added and deleted depending on whether LU# 01 of CHN8 exists(For Dump) | 100MB |
| 2B | Automatically added and deleted depending on whether LU# 09 of CHN1 exists(OS Backup) | 200MB |
| 2C | Automatically added and deleted depending on whether LU# 09 of CHN2 exists(OS Backup) | 200MB |
| 2D | Automatically added and deleted depending on whether LU# 09 of CHN3 exists(OS Backup) | 200MB |
| 2E | Automatically added and deleted depending on whether LU# 09 of CHN4 exists(OS Backup) | 200MB |
| 2F | Automatically added and deleted depending on whether LU# 09 of CHN5 exists(OS Backup) | 200MB |
| 30 | Automatically added and deleted depending on whether LU# 09 of CHN6 exists(OS Backup) | 200MB |
| 31 | Automatically added and deleted depending on whether LU# 09 of CHN7 exists(OS Backup) | 200MB |
| 32 | Automatically added and deleted depending on whether LU# 09 of CHN8 exists(OS Backup) | 200MB |
| 3B | Automatically added and deleted depending on whether LU# 0A of CHN1 exists(Shared Backup) | 60MB |
| 3C | Automatically added and deleted depending on whether LU# 0A of CHN2 exists(Shared Backup) | 60MB |
| 3D | Automatically added and deleted depending on whether LU# 0A of CHN3 exists(Shared Backup) | 60MB |
| 3E | Automatically added and deleted depending on whether LU# 0A of CHN4 exists(Shared Backup) | 60MB |
| 3F | Automatically added and deleted depending on whether LU# 0A of CHN5 exists(Shared Backup) | 60MB |
| 40 | Automatically added and deleted depending on whether LU# 0A of CHN6 exists(Shared Backup) | 60MB |
| 41 | Automatically added and deleted depending on whether LU# 0A of CHN7 exists(Shared Backup) | 60MB |
| 42 | Automatically added and deleted depending on whether LU# 0A of CHN8 exists(Shared Backup) | 60MB |

FIG. 26

| # | User Input | SVP | NAS Blade |
|---|---|---|---|
| 1 | Select Port for which Path Definition is desired | | |
| 2 | | Display List of LUNs settable to this Port | |
| 3 | Select LUN for which Path Definition is desired (System LU) | | |
| 4 | | Display List of LDEVs settable to this LUN (Capacity Check) | |
| 5 | Select one of LDEV Settable to LUN | | |
| 6 | | Allocate selected LDEV to this LUN | |
| 7 | (Repeat above processing for required LUs or Make setting only to one LU) | | |
| 8 | Select LU for which Path Definition is desired (Backup of System LU) | | |
| 9 | | Display List of LDEVs settable to this LU (Capacity Check) | |
| 10 | Select one of LDEVs settable to LUN | | |
| 11 | | Allocate selected LDEV to this LUN | |
| 12 | (Repeat above processing for required LUs or Make setting only to one LU) | | |
| 13 | | Notify all NAS Blades of suite of set LUN and LDEV in table form | |
| 14 | | | IOP allocated Backup LU of System LU under control of another NAS Blade of set LUNs, to LUN having shade of meaning "Backup LU under control of other NAS Blade/Port" in its own Table (Complete Path Definition) |
| 15 | | | IOP notifies SVP of Table related to Completed LUN – LDEV Correlation |
| 16 | Confirm Path Definition | | |
| 17 | | Respond to User with completed LUN – LDEV Correlation Table | |

FIG. 29

| # | User Input | SVP | NAS Blade |
|---|---|---|---|
| 21 | Select Port for which Path Definition is desired | | |
| 22 | | Display List of LUNs settable to this Port | |
| 23 | Select LUN for which Path Definition is desired (System LU) | | |
| 24 | | Display List of LDEVs settable to this LUN (Capacity Check) | |
| 25 | Select one of LDEV settable to LUN | | |
| 26 | | Allocate selected LDEV to this LUN | |
| 27 | ... Repeat above processing for required LUs or Make setting only to one LU) ... | | |
| 28 | | Notify all NAS Blades of suite of set LUN and LDEV in table form | |
| 29 | | | IOP extracts LUs to need backup of set LUNs and searches existence of LDEV having necessary Capacity in RAID. |
| 30 | | Respond to LDEV Number meeting conditions from List Table of LDEVs in RAID | |
| 31 | | | Select one of LDEVs meeting conditions and Update LUN – LDEV correlation Table by using it as Backup LU |
| 32 | | | Store updated LUN – LDEV correlation Table in Shared Memory |
| 33 | | | Set, as Flag in Shared Memory, updating of LUN – LDEV correlation Table |
| 34 | | | Notify SVP of LUN – LDEV Correlation Table |
| 35 | | | (Other NAS Blade) Detect updating of LUN – LDEV Correlation Table |
| 36 | | | IOP allocates LU to be reference Of updated LUNs, to LU having shade of meaning of "Backup LU under control of other NAS Blade/Port".(Complete Path Definition) |
| 37 | | | IOP notifies SVP of completed LUN- LDEV Correlation Table |
| 38 | Confirm Path Definition | | |
| 39 | | Respond to User with Completed LUN – LDEV Correlation Table | |

FIG. 30

| # | User Input | SVP | NAS Blade |
|---|---|---|---|
| 41 | Select Port for which Path Definition is desired | | |
| 42 | | Display List of LUNs settable to this Port | |
| 43 | Select LUN for which Path Definition is desired (System LU) | | |
| 44 | | Display List of LDEVs settable to this LUN (Capacity Check) | |
| 45 | Select one of LDEV settable to LUN | | |
| 46 | | Allocate selected LDEV to this LUN | |
| 47 | ... (Repeat above processing for required LUs or Make setting only to one LU) ... | | |
| 48 | Select LU for which Path Definition is desired(Backup of System LU) | | |
| 49 | | Display List of LDEVs settable to this LU(Capacity Check) | |
| 50 | Select one of LDEVs settable to LUN | | |
| 51 | | Allocate selected LDEV to this LUN | |
| 52 | | Determine whether set LU needs to be referenced by other NAS Blades | |
| 53 | | In the case of LUN needing to be referenced by other NAS Blades, allocate, to allocated LDEV, LUN having shade of meaning of "Backup LU under control of other NAS Blade/Port" in LUN – LDEV Correlation Table under control of other NAS Blades(Port). (Complete Path Definition) | |
| 54 | ... (Repeat above processing for required LUs or Make setting only to one LU) ... | | |
| 55 | | Notify all NAS Blades of suite of set LUN and LDEV in table form | |
| 56 | Confirm Path Definition | | |
| 57 | | Respond to User with completed LUN – LDEV Correlation Table | |

| LUN# | Contents | LDEV Minimum Capacity |
|---|---|---|
| 00 | User Data LU | Limitless |
| 01 | User Data LU | Limitless |
| 02 | User Data LU | Limitless |
| 03 | User Data LU | Limitless |
| ... | ... | ... |
| FF | User Data LU | Limitless |

FIG. 34

| Site | Processing | | Screen Portion | Execution Portion |
|---|---|---|---|---|
| Group | Default Group#00 | | — | Being created at Execution Portion |
| | Default Group#01 | | — | Being created at Execution Portion |
| | Host Mode | | No Display & Alternation Suppression | Suppression |
| LUN | Group#00 | Add Path | Permit | — |
| | | Delete Path | Permit | Being inhibited if User LU is given |
| | | Set conventional Command Device | Permit setting LUN#05 | Suppression |
| | Group#01 | Add Path | Permit | Being inhibited if System LU is yet to be given |
| | | Delete Path | Permit | Permit |
| | | Set conventional Command Device | Permit | Permit |

FIG. 35

| Condition | | Setting | |
|---|---|---|---|
| Group#00 | Group#01 | LUN Definition to Group #00 | LUN Definition to Group #01 |
| Provide no LUN | Provide no LUN | Addition/Deletion permitted | Addition/Deletion not permitted |
| Provide LUN | Provide no LUN | Addition/Deletion permitted | Addition/Deletion permitted |
| Provide LUN | Provide LUN | Addition/Deletion not permitted | Addition/Deletion permitted |
| Provide no LUN | Provide LUN | Nonexistence | |

DISK ARRAY DEVICE INCLUDING A SYSTEM LU FOR STORING CONTROL INFORMATION IN THE DISK ARRAY AND BACKUP LU FOR BACKING UP THE CONTROL INFORMATION AND CONTROLLING METHOD THEREOF

CROSS-REFERENCE TO RELATED APPLICATION

This application is a continuation of application Ser. No. 10/911,604, filed Aug. 5, 2004, now U.S. Pat. No. 7,149,861. The present application claims priority from Japanese patent application No. JP 2004-157348 filed on May 27, 2004, the content of which is hereby incorporated by reference into this application.

BACKGROUND OF THE INVENTION

The present invention relates to a disk array device and a technique for controlling the same and, more particularly, to a technique effectively applied to a controlling method of replication of a storage unit system that can be connected to a plurality of different kinds of networks.

The inventors of the present invention have examined a conventional disk array device and a technique for controlling it and consequently understood as follows.

Recently, there has been a rapid increase in quantity of data to be handled in a computer system. To efficiently utilize and manage such vast data, there has been developed a technique which connects a plurality of disk array devices (hereinafter "storage unit systems") and an information processing apparatus to each other through a dedicated network (Storage Area Network, which is hereinafter abbreviated as "SAN") so that high-speed and vast data access to the storage unit systems can be realized. In order to realize high-speed data transfer by connecting the storage unit systems and the information processing apparatus to each other, generally the network is built up using a communication instrument that complies with a fiber channel protocol.

Meanwhile, there has been developed a network system referred to as a network attached storage (NAS), which connects a plurality of storage unit systems and an information processing apparatus to each other through a network that uses a transmission control protocol/Internet protocol (TCP/IP) so that the storage unit systems can be accessed at a file level. In the NAS, a device having a file system function is connected to the storage unit system, so that it is possible for the information processing apparatus to gain access at a file level. See Japanese Patent Laid-open No. 2002-351703.

SUMMARY OF THE INVENTION

However, regarding the technique for controlling the conventional disk array device, the above-mentioned inventors have found out the followings from the examined results.

For example, the conventional NAS has been realized by connecting the information processing apparatus having a TCP/IP communication function and a file system function to the storage unit system not having them. Therefore, a space is required for installing this information processing apparatus to be connected. Further, in many cases the information processing apparatus and the storage unit system are connected to each other through the SAN because communication needs to be performed at high speed. Accordingly, a communication control instrument and a communication control function need to be provided.

In view of the above, the present invention has been developed, and a main object of the present invention is to provide a storage unit system that can be connected to a plurality of different kinds of networks, and to provided a controlling method of replication of a system region of a storage device control unit required in such a storage unit system.

The above and other objects and novel characteristics will become apparent from the description of the specification and the accompanying drawings.

Outlines of representative ones of inventions disclosed in the present application will be briefly described as follows.

The present invention is applied to a disk array device and a controlling method thereof, the disk array device comprising: a plurality of storage devices for storing data: a storage device control unit for controlling a data write or read operation to the plurality of storage devices; a connection portion connected to the storage device control unit; a plurality of channel control portions for receiving a write or read request from an external host device of the disk array device itself, converting file-level data sent from the host device into block-level data, and transferring it to the plurality of storage devices so that these data pieces may be classified into a plurality of cluster groups; a shared memory storing control information exchanged between the plurality of channel control portions and the storage device control unit; a cache memory temporarily saving data exchanged between the plurality of channel control portions and the storage device control unit; and a management terminal for setting a logical configuration of the plurality of storage devices. Further, the present invention has the following characteristics.

That is, in the present invention, in a plurality of LDEVs which are logical storage regions of the plurality of storage devices, a system LU which is a storage region for storing control information in the disk array device itself and a user LU which is a storage region for writing write data sent from the host device are settable; the management terminal specifies the system LU or the user LU in order to set a path definition with respect to the plurality of LDEVs; and the plurality of channel control portions each inhibit an access to the system LU from the host device in accordance with distinction of the system LU or the user LU specified by the management terminal.

Further, in the present invention, in the plurality of LDEVs of the plurality of storage devices, a backup LU which is a storage region for backing up the control information stored in the system LU is settable; and a path of the system LU is automatically defined with respect to the backup LU, and the control information stored in the system LU is backed up with respect to the backup LU.

More specifically, the function to automatically define the path of the system LU is realized by the management terminal and the plurality of channel control portions; the management terminal assigns the system LU of which a path definition is desired, to the settable LDEV of the plurality of LDEVs; and the plurality of channel control portions each define automatically a path of the system LU with respect to the backup LU of the settable LDEV assigned by the management terminal.

Or, the function to automatically define the path of the system LU is realized by the plurality of channel control portions; and the plurality of channel control portions each assign the system LU for which a path definition is desired, to the settable LDEV of the plurality of LDEVs, and define automatically a path of the system LU with respect to the backup LU of the settable LDEV assigned.

Alternatively, the function to automatically define the path of the system LU is realized by the management terminal; and the management terminal assigns the system LU for which a path definition is desired, to the settable LDEV of the plurality of LDEVs, and defines automatically a path of the system LU with respect to the backup LU of the settable LDEV assigned.

For example, the control information stored in the system LU is OS information, dump information, command device information, fault information, or cluster-shared information; and the OS information, dump information, command device information, fault information, or cluster-shared information is backed up to the backup LU.

Effects obtained by representative ones of inventions disclosed in the present invention will be briefly described as follows.

According to the present invention, it is possible to provide a storage unit system that can be connected to a plurality of different kinds of networks, and further to provide a controlling method for replication of a system region of a storage device control unit that is required in such a storage unit system. In particular, it is possible to, in accordance with settings by maintenance people or users, separate a system LU and a user LU from each other explicitly and specify a backup LU only for the system LU and also automatically set definition of a path and a decrease in number of paths provided so that access can be gained from each package according to a predetermined policy.

BRIEF DESCRIPTION OF THE DRAWINGS

FIG. 3 is a diagram showing a physical disk management table in the storage unit system according to the one embodiment of the present invention.

FIG. 12 is a diagram showing roles of a system LU in the storage unit system according to the one embodiment of the present invention.

FIG. 19 is a diagram showing an LUN definition for host group #00 in the storage unit system according to the one embodiment of the present invention.

FIG. 26 is a flowchart for showing processings for path definitions of various LUs plus backup LUs by an SVP-and-NAS blade-led method in the storage unit system according to the one embodiment of the present invention.

FIG. 29 is a flowchart showing processings for path definitions of various kinds of LUs plus backup LUs by an NAS blade (NASOS)-led method in the storage unit system according to the one embodiment of the present invention.

FIG. 30 is a flowchart showing processings for path definitions of various kinds of LUs plus backup LUs by an SVP-led method in the storage unit system according to the one embodiment of the present invention.

FIG. 34 is a diagram showing an outline of a function of each module in the storage unit system according to the one embodiment of the present invention.

FIG. 35 is a diagram showing permission/inhibition of setting in an LUN definition in the storage unit system according to the one embodiment of the present invention.

DESCRIPTION OF THE PREFERRED EMBODIMENTS

Hereinafter, an embodiment of the present invention will be detailed based on the drawings. Note that the members having the same function are denoted by the same reference symbol in principle throughout all the drawings for explaining the embodiments and the repetitive description thereof will not be omitted.

<Overall Configuration Example of System Including Storage Unit System>

Figure 1:
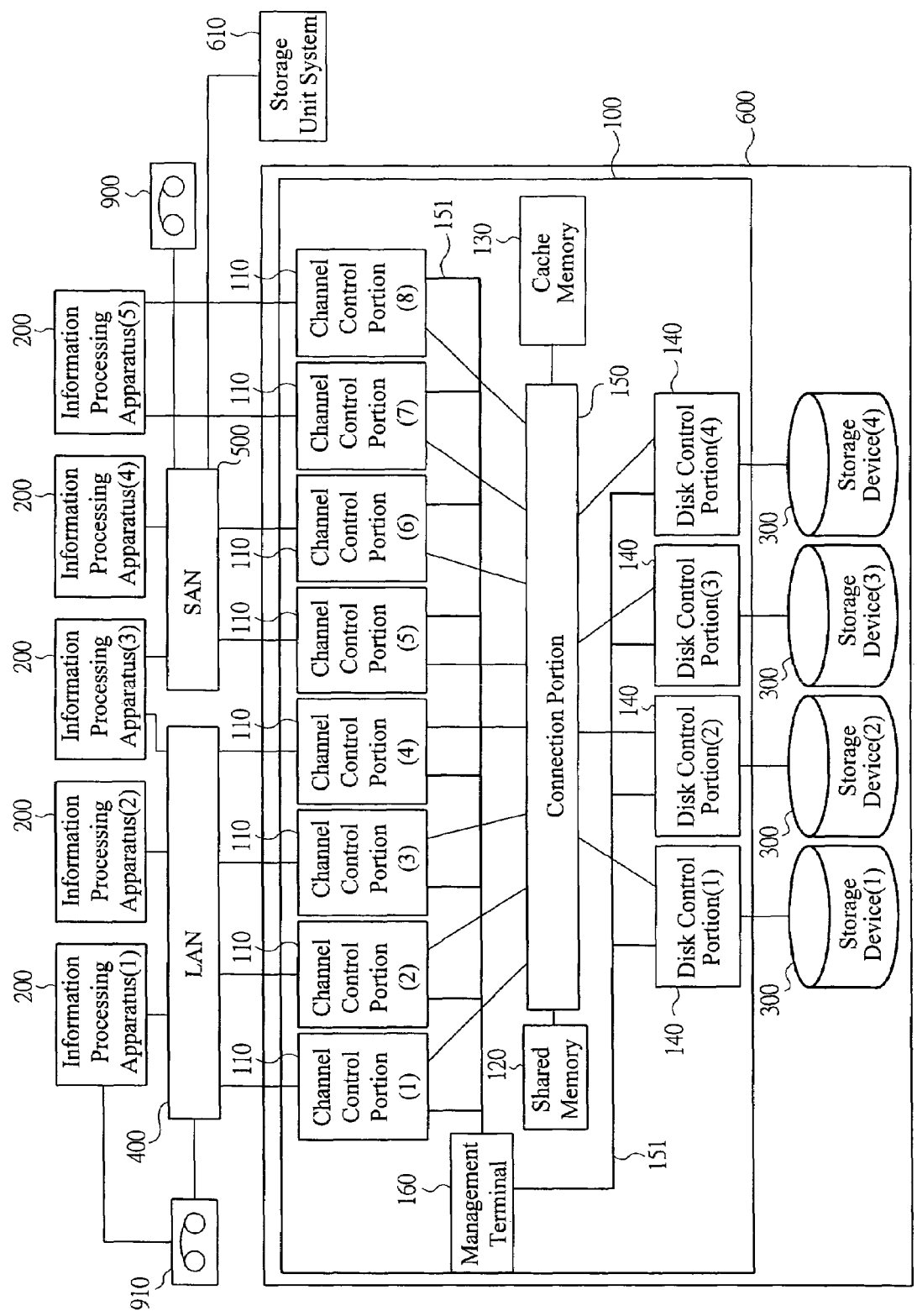
FIG. 1 is a block diagram for showing an overall configuration of a system that includes a storage unit system according to one embodiment of the present invention.

The following will describe one example of an overall configuration of a system including a storage unit system according to an embodiment with reference to FIG. 1. FIG. 1 is a block diagram for showing an overall configuration of a system that includes a storage unit system.

A storage unit system 600 according to the present embodiment comprises a storage device control unit 100 and a storage device 300. The storage device control unit 100 controls the storage device 300 in accordance with a command received from an information processing apparatus 200. For example, it receives a data input/output request from the information processing apparatus and performs processing for inputting and outputting data to and from the storage device 300. The data is stored in a logical volume (which is a logical unit and hereinafter abbreviated as "LU"), i.e. a storage region logically set in a physical storage region provided by a disk drive that the storage device 300 has. Further, the storage device 100 exchanges various commands for managing the storage unit system 600 with the information processing apparatus 200.

The information processing apparatus 200 is a computer provided with a central processing unit (CPU) and a memory. The CPU of the information processing apparatus 200 executes various programs, thereby realizing various functions. The information processing apparatus 200 may be, for example, a personal computer or a workstation as well as a mainframe computer.

In FIG. 1, the information processing apparatuses (1) 200 through (3) 200 are connected to the storage device control unit 100 via a local area network (LAN) 400. The LAN 400 may be the Internet or a dedicated network. Communication is established between the information processing apparatuses (1) 200 through (3) 200 and the storage device control unit 10 via the LAN 400 in accordance with, for example, the TCP/IP. The information processing apparatuses (1) 200 through (3) 200 transmit to the storage unit system 600 a data access request by specification of a file name (which is a data input/output request for each file and hereinafter written also as a "file access request").

To the LAN 400, a backup device 910 is connected. The backup device 910 is specifically a disk device such as an MO, CD-R, or DVD-RAM or a tape device such as a DAT tape, cassette tape, open-reel tape, or cartridge tape. The backup device 910 communicates with the storage device control unit 100 via the LAN 400, thereby storing backup data of data stored in the storage device 300. Further, the backup device 910 may also be connected to the information processing apparatus (1) 200. In this case, backup data of the data stored in the storage device 300 is intended to be acquired through the information processing apparatus (1) 200.

The storage device control unit 100 is provided with channel control portions (1) 110 through (4) 110. The device control unit 100 receives file access requests individually from the information processing apparatuses (1) 200 through (3) 200, from the channel control portions (1) 110 through (4) 110 via the LAN 400. That is, the channel control portions (1) 110 through (4) 110 are each assigned a network address on the LAN 400 (e.g., IP address) beforehand and behave individually as an NAS, and therefore can give a service as the NAS to the information processing apparatuses (1) 200 through (3) 200 as if the individual NAS is an independent one. Hereinafter, each of the channel control portions (1) 110 through (4) 110 is written also as a "CHN". In such a manner, the one storage unit system 600 is provided in configuration with the channel control portions (1) 110 through (4) 110, each of which gives a service individually as an NAS, whereby NAS servers conventionally operated by individually independent computers are integrated into one storage unit system 600. It is therefore possible to conduct blanket control over the storage unit system 600 and thereby to promote efficient maintenance such as various settings and control, hazard management, and version management.

Note that the channel control portions (1) 110 through (4) 110 of the storage device control unit 100 according to the present embodiment are, as described later, realized by hardware formed in an integrated unit circuit board and an operating system (hereinafter written as "OS" also) executed by this hardware or by software such as an application program that operates on this OS or executable object codes executed by this hardware. In such a manner, in the storage unit system 600 according to the present embodiment, functions conventionally mounted as part of the hardware are realized by the software. Therefore, in the storage unit system 600 of the present embodiment, a system operation is possible with sufficient flexibility, whereby it is possible to provide sophisticated services based on multifarious user needs that change rapidly.

The information processing apparatuses (3) 200 and (4) 200 are connected to the storage device control unit 100 via a storage area network (SAN) 500. The SAN 500 is a network for exchanging data with the information processing apparatuses (3) 200 and (4) 200 by using, as one unit, a block that is a data management unit in a storage region provided by the storage device 300. Communication between the storage device control unit 100 and the information processing apparatuses (3) 200 and (4) 200 via the SAN 500 is typically established in accordance with a fiber channel protocol. From the information processing apparatuses (3) 200 and (4) 200, data access requests (hereinafter written as "block access requests") are transmitted to the storage unit system 600 in units of a block in accordance with the fiber channel protocol.

The storage device control unit 100 communicates with the information processing apparatuses (3) 200 and (4) 200 through the channel control portions (5) 110 and (6) 110. Hereinafter, each of the channel control portions (5) 110 and (6) 110 is written as a "CHF" also.

To the SAN 500, backup device 900 that accommodates an SAN is connected. The backup device 900 that accommodates the SAN communicates with the storage device control unit 100 via the SAN 500, thereby storing backup data of the data stored in the storage device 300.

The information processing apparatus (5) 200 is connected to the storage device control unit 100 neither through the LAN 400 nor through the SAN 500. The information processing apparatus (5) 200 may be, for example, a mainframe computer. Communication between the information processing apparatus (5) 200 and the storage device control unit 100 is established in accordance with a communication protocol such as FICON (Fibre Connection) (Registered Trademark), ESCON (Enterprise System Connection) (Registered Trademark), ACONARC (Advanced Connection Architecture) (Registered Trademark), or FIBARC (Fibre Connection Architecture) (Registered Trademark). From the information processing apparatus (5) 200, a block access request is transmitted to the storage unit system 600 in these communication protocols.

The storage device control unit 100 communicates with the information processing apparatus (5) 200 through the channel control portions (7) 110 and (8) 110. Hereinafter, each of the channel control portions (7) 110 and (8) 110 is written as a "CHA" also.

To the SAN 500, there is connected another storage unit system 610 which is installed to a location (secondary site) far away from an installation site (primary site) of the storage unit system 600. The storage unit system 610 is utilized as an apparatus of a data replication destination in a replication or remote-copy function as described later. Note that the storage unit system 610 is in some cases connected to the storage unit system 600 via a communication line such as an ATM other than the SAN 500. In this case, for example, the channel control portion 110 provided with an interface (channel extender) for utilizing the above-mentioned communication line is employed as the channel control portion 110.

<Storage Device>

The storage device 300 is equipped with a number of disk drives (physical disks) and provides a storage region to the information processing apparatus 200. Data is stored beforehand in an LU, which is a storage region logically set in a physical storage region provided by the disk drive. The disk drive may be any one of various drives such as a hard disk unit, a flexible disk unit, and a semiconductor storage unit. Note that, in the storage device 300, for example, a plurality of disk drives can be combined to configure a disk array. In this case, a storage region to be provided to the information processing apparatus 200 may be configured by using a plurality of disk drives managed by a redundant array of inexpensive disks (RAID).

The storage device control unit 100 and the storage device 300 may be connected in direct connection form as shown in FIG. 1 or through a network. Furthermore, the storage device 300 can be formed integrally with the storage device control unit 100.

The LU to be set to the storage device 300 may be a user LU accessible from the information processing apparatus 200, and a system LU used for controlling the channel control portion 110, etc. The system LU stores also the OS to be executed by the CHN 110. Further, each of the LUs is correlated with each channel control portion 110. With this, each channel control portion 110 is assigned an accessible LU. Further, in this correlation, a plurality ones of the channel control portions 110 may share one LU. Note that hereinafter the user LU and the system LU are written also as a "user disk" and a "system disk" respectively.

<Storage Device Control Unit>

The storage device control unit 100 comprises the channel control portion 110, the shared memory 120, a cache memory 130, a disk control portion 140, a management terminal 160, and a connection portion 150.

The channel control portion 110 is provided with a communication interface for communicating with the information processing apparatus 200, thus having a function to exchange a data input/output command with the information processing apparatus 200. For example, the CHN 110 receives a file access request sent from the information processing apparatuses (1) 200 through (3) 200. Due to this, the storage unit system 600 can provide a serve as an NAS to the information processing apparatuses (1) 200 through (3) 200. Further, the CHF 110 receives a block access request sent from the information processing apparatuses (3) 200 and (4) 200 in accordance with the fiber channel protocol. For this reason, the storage unit system 600 can provide, to the information processing apparatuses (3) 200 and (4) 200, a data storage service capable of high-speed access. Further, the CHA 110 receives a block access request sent from the information processing apparatus (5) 200 in accordance with a protocol such as FICON, ESCON, ACONARC, or FIBERC. Thereby, the storage unit system 600 can provide the data storage service also to the mainframe computer such as the information processing apparatus (5) 200.

The channel control portions 110 as well as the management terminal 160 are mutually connected through a communication network such as an internal LAN 151. This enables to transmit, from the management terminal 160, a micro-program etc. to be executed by the channel control portion 110 so that the program may be installed. A configuration of the channel control portion 110 will be described later.

The connection portion 150 is connected to the channel control portion 110, the shared memory 120, the cache memory 130, and the disk control portion 140. Data and commands are exchanged among the channel control portion 110, the shared memory 120, the cache memory 130, and the disk control portion 140 via the connection portion 150. The connection portion 150 is comprised of, for example, a bus or a switch such as an ultra-high speed crossbar switch for transferring data by high-speed switching. Since the channel control portions 110 are connected to each other through the switch, performance of communication between the channel control portions 11 is greatly improved as compared to that of a conventional configuration in which the channel control portions are connected to each other through the LAN by the NAS server operating on each of the computers. Due to this, a file sharing function and/or high-speed fail-over can be achieved.

The shared memory 120 and the cache memory 130 is a storage memory shared by the channel control portion 110 and the disk control portion 140. The shared memory 120 is mainly utilized to store control information and commands, whereas the cache memory 130 is mainly utilized to store data.

For example, in the case where a data input/output command received by one of the channel control portions 110 from the information processing apparatus 200 is a write command, the one channel control portion 110 writes the write command into the shared memory 120 and also writes, into the cache memory 130, write data received from the information processing apparatus 200. Meanwhile, when the disk control portion 140 monitoring the shared memory 120 detects that the write command is written into the shared memory 120, it reads the write data from the cache memory 130 in accordance with this command and writes it into the storage device 300.

Further, for example, in the case where a data input/output command received by one of the channel control portions 110 from the information processing apparatus 200 is a read command, the one channel control portion 110 writes the read command into the shared memory 120 and reads, from the cache memory 130, data demanded by the read command from the information processing apparatus 200. If the data demanded by the read command has not been written in the cache memory 130, the channel control portion 110 or the disk control portion 140 reads, from the storage device 300, data demanded by the read command and writes it into the cache memory 130.

Note that although in this embodiment the shared memory 120 and the cache memory 130 have been described as being provided independently of the channel control portion 110 and the disk control portion 140, the present invention is not limited to this and the shared memory 120 and the cache memory 130 are preferably provided separately in the channel control portion 110 and the disk control portion 140. In this case, the connection portion 150 mutually connects the channel control portion 110 and the disk control portion 140, each of which has either one of the shared memory 120 and the cache memory 130.

The disk control portion 140 controls the storage device 300. For example, as described above, data is written into the storage device 300 in accordance with a data write command received by the channel control portion 110 from the information processing apparatus 200. Further, a data access request for an LU by specification of a logical address transmitted from the channel control portion 110 is converted into a data access request for a physical disk by specification of a physical address. In the case where the physical disk in the storage device 300 is managed by an RAID, data access in accordance with an RAID configuration is executed. Further, the disk control portion 140 controls replication management and backup of data stored in the storage device 300. Furthermore, to prevent vanishing of data at the time of disaster occurrence (disaster recovery), the disk control portion 140 conducts control so as to store a replica of data of the storage unit system 600 installed at the primary site also in the other storage unit system 610 installed at the secondary site (replication function or remote copy function).

The respective disk control portions 140 as well as the management terminal 160 are connected to each other through a communication network such as the internal LAN 151 and can communicate with each other. Due to this, a micro-program etc. to be executed by the disk control portion 140 is transmitted from the management terminal 160 so that it may be installed. A configuration of the disk control portion 140 will be described later.

<Management Terminal>

The management terminal 160 is a computer for maintenance and management of the storage unit system 600. By operating the management terminal 160, it is possible to, for example, set a configuration of a physical disk in the storage device 300 and set the LU, and install a micro-program to be executed by the channel control portion 110 or the disk control portion 140. As for this setting of a physical disk configuration in the storage device 300, for example, the number of the physical disks can be increased or decreased and an RAID configuration can be changed (e.g., from RAID1 to RAID5).

Furthermore, the management terminal 160 can confirm an operation state of the storage unit system 600 and identify a location of a trouble, and install the OS to be executed by the channel control portion 110. Further, the management terminal 160 is connected to an external maintenance center through a LAN or a telephone circuit and, therefore, can be utilized to monitor a fault of the storage unit system 600 and cope with it rapidly when it has occurred. Occurrence of a fault is notified by, for example, an OS, application program, or driver software, etc. This notification is, for example, a HTTP protocol, Simple Network Management Protocol (SNMP), or e-mail, etc. These setting and control operations are performed by an operator who uses, as a user interface, a Web page provided by a Web server that operates in the management terminal 160. The operator etc. can operate the management terminal 160 to set a target and contents that are subject to fault monitoring or to a destination to be notified of the fault.

The management terminal 160 may be in built-in form of the storage device control unit 100 or in externally mounted form. Further, the management terminal 160 may be used as a dedicated computer for maintenance and management of the storage device control unit 100 and the storage device 300 or as a general-purpose computer provided with the maintenance and management functions.

<Configuration Example of Management Terminal>

Figure 2:
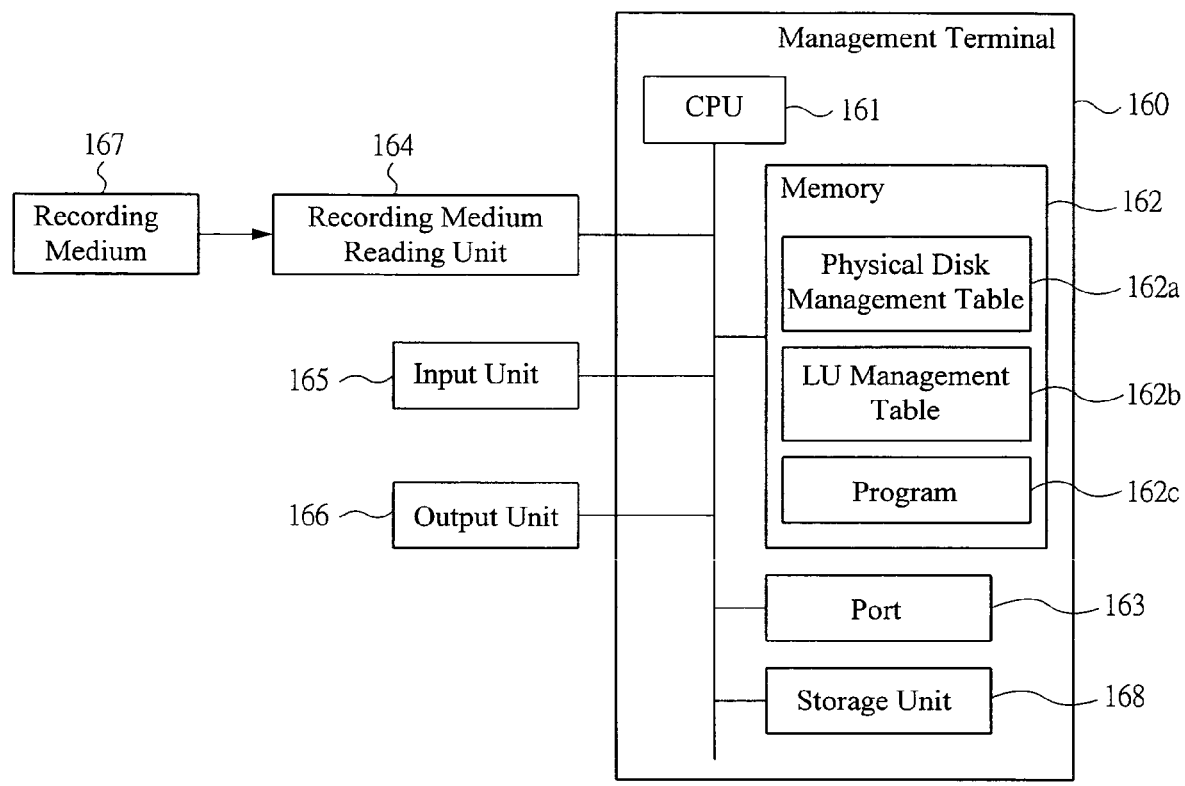
FIG. 2 is a diagram showing a configuration of a management terminal in the storage unit system according to the one embodiment of the present invention.
Figures 4, 5:
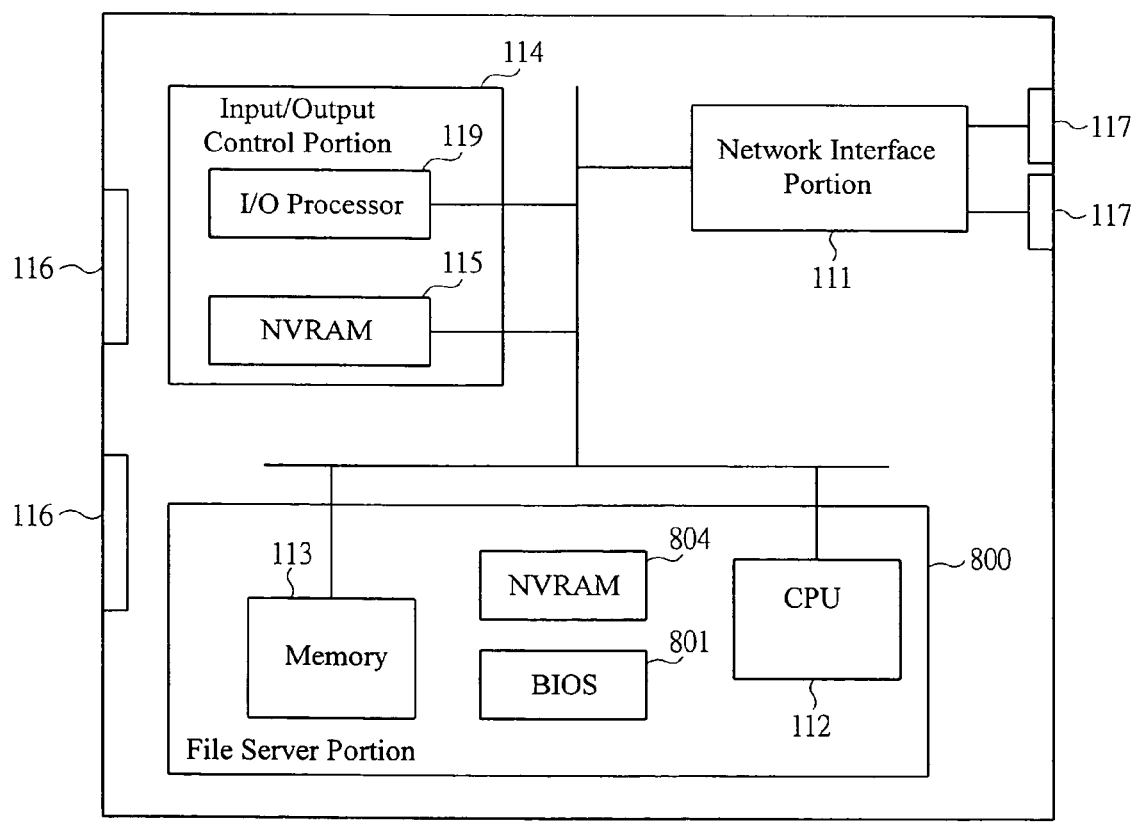
FIG. 4 is a diagram showing an LU management table in the storage unit system according to the one embodiment of the present invention.
FIG. 5 is a diagram showing a hardware configuration of a channel control portion in the storage unit system according to the one embodiment of the present invention.

The following will describe one configuration example of the management terminal in the storage unit system according to the present embodiment with reference to FIGS. 2 to 4. FIG. 2 is a diagram showing a configuration of the management terminal; FIG. 3 is a diagram showing a physical disk management table; and FIG. 4 is a diagram showing an LU management table.

As shown in FIG. 2, the management terminal 160 comprises a CPU 161, a memory 162, a port 163, a storage medium reading unit 164, an input unit 165, an output unit 166, and a storage unit 168.

The CPU 161 controls the entirety of the management terminal 160 and execute a program 162c stored in the memory 162, thereby realizing a function as a Web server. In the memory 162, a physical disk management table 162a, an LU management table 162b, and the program 162c are stored.

The physical disk management table 162a is a table for managing a physical disk (disk drive) equipped to the storage device 300. This physical disk management table 162a is shown in, for example, FIG. 3. In FIG. 3, the physical disks having disk numbers #001 through #006 of a number of physical disks equipped to the storage device 300 are indicated. For each of the physical disks, its capacity, RAID configuration, and busy condition are indicated.

The LU management table 162b is a table for managing an LU logically set on the above-mentioned physical disk. This LU management table 162b is shown in, for example, FIG. 4. In FIG. 4, the LUs having LU numbers #1 through #3 of a number of LUs set in the storage device 300 are indicated. For each of the LUs, its physical disk number, capacity, and RAID configuration are indicated.

The storage medium reading unit 164 is a unit for reading programs and data recorded in a recording medium 167. The read programs and data are stored in the memory 162 or the storage unit 168. Therefore, it is possible, for example, to read the program 162c recorded in the recording medium 167 through the recording medium 167 by using the recording medium reading unit 164 and to store it in the memory 162 or the storage unit 168. As the recording medium 167, for example, a flexible disk, a CD-ROM, or a semiconductor memory can be used. The recording medium reading unit 164 can also be contained in the management terminal 160.

The storage unit 168 may be, for example, a hard disk unit, a flexible disk unit, or a semiconductor memory. The input unit 165 is used by the operator etc. to enter data to the management terminal 160. As the input unit 165, for example, a keyboard or a mouse is used. The output unit 166 is a unit for outputting information to the outside. As the output unit 166, for example, a display or a printer is used. The port 163 is connected to the internal LAN 151, so that the management terminal 160 can communicate with the channel control portion 110, and the disk control portion 140, etc. Further, the port 163 may be connected to the LAN 400 or the telephone circuit.

<Configuration Example of Channel Control Portion>

Figures 6, 7:
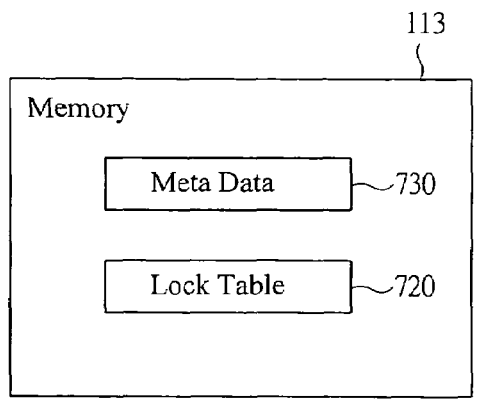
FIG. 6 is an explanatory diagram for describing contents of data to be stored in a memory in the storage unit system according to the one embodiment of the present invention.
FIG. 7 is a diagram showing meta data in the storage unit system according to the one embodiment of the present invention.

The following will describe one example of a configuration of the channel control portion in the storage unit system according to the present embodiment with reference to FIGS. 5 to 8. FIG. 5 is a diagram showing a hardware configuration of the channel control portion; FIG. 6 is an explanatory diagram for describing contents of data to be stored in the memory; FIG. 7 is a diagram showing meta data; and FIGS. 8A and 8B are diagrams showing lock data.

As described above, the storage unit system 600 according to the present embodiment receives a file access request through the CHN 110 from the information processing apparatuses (1) 200 through (3) 200 and provides a service as an NAS to the information processing apparatuses (1) 200 through (3) 200.

As shown in FIG. 5, hardware of the CHN 110 is constituted as one unit. Hereinafter this unit is written as an "NAS board". The NAS board is comprised of one or a plurality of circuit boards. More specifically, the NAS board comprises a network interface portion 111, an input/output control portion 114, a board-connecting connector 116, a communication connector 117, and a file server portion 800 that are all formed in the same unit. Furthermore, the input/output control portion 114 has a non-volatile RAM (NVRAM) 115 and an input/output (I/O) processor 119.

The network interface portion 111 is provided with a communication interface for communicating with the information processing apparatus 200. In the case of the CHN 110, a file access request transmitted from the information processing apparatus 200 in accordance with, for example, the TCP/IP protocol is received. The communication connector 117 is a connector for communicating with the information processing apparatus 200. In the case of the CHN 110, it is a connector connectable to the LAN 400 and accommodates, for example, Ethernet (Registered Trademark).

The file server portion 800 has a CPU 112, a memory 113, a Basic Input/Output System (BIOS) 801, and an NVRAM 804. The CPU 112 has control for making the CHN 110 function as the NAS board.

The CPU 112 performs such processing as: analysis of a file access request by file specification; mutual transposition by use of a conversion table (not shown) between file-unit data to control information in the memory 113 in the process of activating the CPU 112 and an LU in the storage device 300; generation of a data write/read request to an LU in the storage device 300; transmission of a data write/read request to the I/O processor 119; and the like. The BIOS 801 is software to be loaded first in the memory 113 and executed for example upon power application of the CHN 110 and saved in a non-volatile medium such as a flash memory and installed in the CHN 110.

The CPU 112 can execute software read from the BIOS 801 into the memory 113, thereby initializing and diagnosing portions related with the CPU 112 in the CHN 110. Furthermore, the CPU 112 can issue an instruction such as a command from the BIOS 801 to the I/O processor 119, thereby reading a predetermined program, for example, a boot portion of the OS from the storage device 300 into the memory 113. The read OS boot portion acts to further read a main portion of the OS stored in the storage device 300 into the memory 113, to thus activate the OS in the CPU 112, in which the OS can in turn execute processing as, for example, a file server. Further, the file server portion 800 is mounted with the NVRAM 804 for storing a network boot loader that is compliant with a prescription such as Preboot Execution Environment (PXE) and can perform a network boot operation described later.

Figure 10:
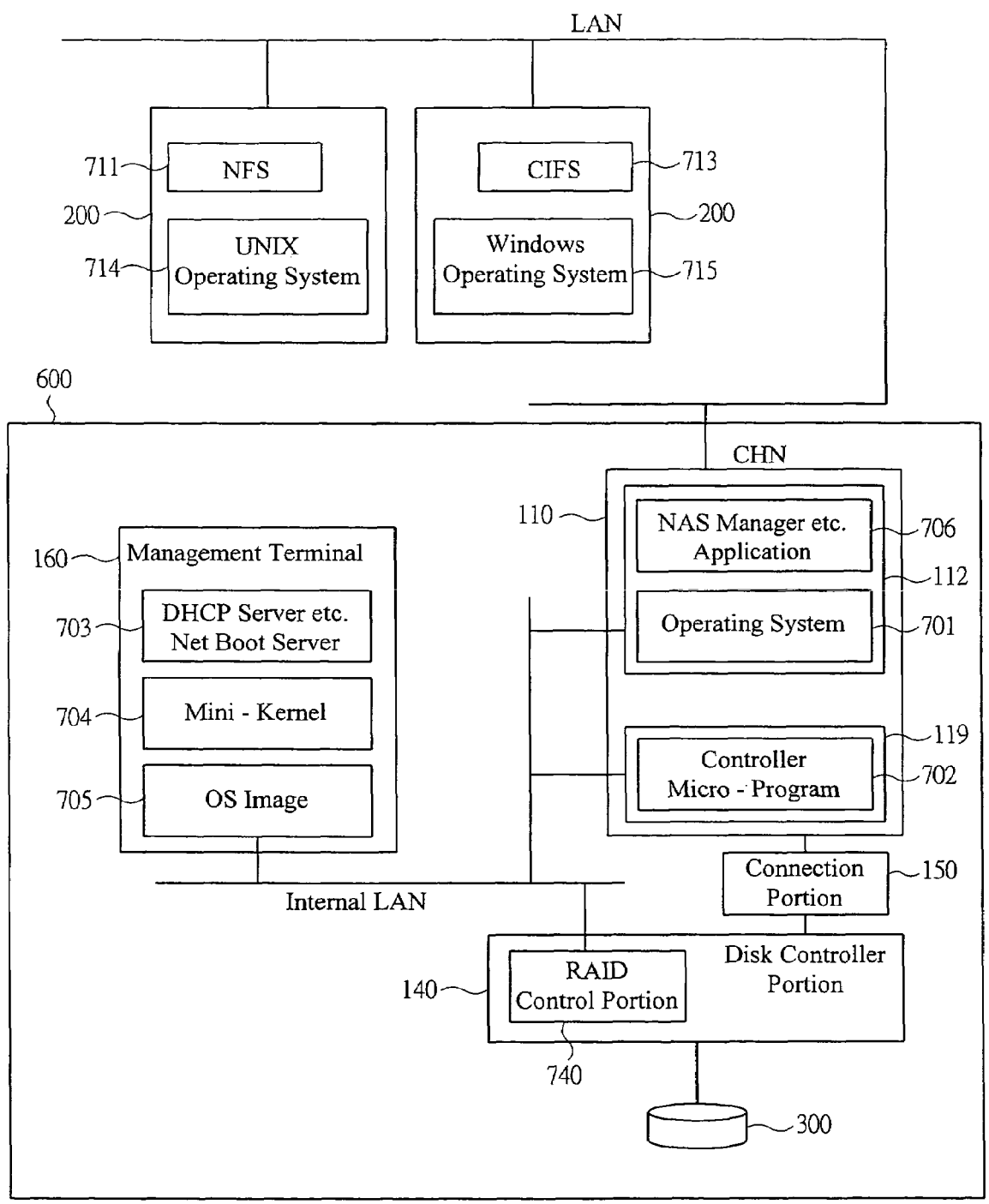
FIG. 10 is a diagram showing a software configuration in the storage unit system according to the one embodiment of the present invention.

Various programs and data are stored in the memory 113. For example, meta data 730 or a lock table 720 shown in FIG. 6 and various programs such as an NAS manager 706 shown in FIG. 10 are stored. The meta data 730 is information generated in accordance with a file managed by a file system. The meta data 730 contains information required to identify a file storage location, such as an LU address of stored file data or a data size. The meta data 730 may in some cases contain information such as a file capacity, owner, or update time. Further, the meta data 730 may be created not only in accordance with a file but also with a directory. An example of the meta data 730 is shown in FIG. 7. The meta data 730 is stored also in each of the LUs in the storage device 300.

Figures 8A, 8B, 9:
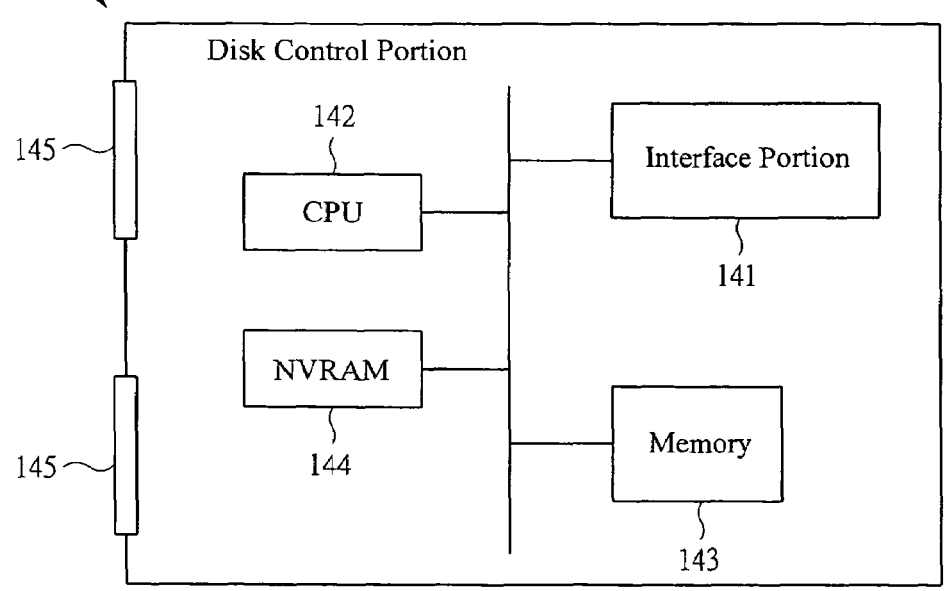
FIG. 8A is a diagram showing lock data in the storage unit system according to the one embodiment of the present invention.
FIG. 8B is a diagram showing lock data in the storage unit system according to the one embodiment of the present invention.
FIG. 9 is a diagram showing a hardware configuration of a disk control portion in the storage unit system according to the one embodiment of the present invention.

The lock table 720 is arranged to conduct exclusive control on file access placed from the information processing apparatuses (1) 200 through (3) 200. By exclusive control, a file can be shared by the information processing apparatuses (1) 200 through (3) 200. The lock table 720 is such as shown in, for example, FIG. 8. As shown in FIG. 8, the lock table 720 has a file lock table 721 as shown in FIG. 8A and an LU lock table 722 as shown in FIG. 8B. The file lock table 721 indicates whether each file is locked. If a file is made open by one of the information processing apparatuses 200, this file is locked. This locked file is inhibited from being accessed from any other information processing apparatuses 200. The LU lock table 722 indicates whether each of the LUs is locked. If an LU is being accessed by one of the information processing apparatuses 200, this LU is locked. The locked LU is inhibited from being accessed by any other information processing apparatuses 200.

The input/output control portion 114 exchanges data and commands among the disk control portion 140, the cache memory 130, the shared memory 120, and the management terminal 160. The input/output control portion 114 is equipped with the I/O processor 119 and the NVRAM 115. The I/O processor 119 is constituted of, for example, a one-chip microcomputer. The I/O processor 119 controls transfer of data and data write/read requests to the LUs in the storage device 300 and relays communication between the CPU 112 and the disk control portion 140. The NVRAM 115 is a non-volatile memory for storing a program that controls the I/O processor 119. Contents of the program stored in the NVRAM 115 can be subject to write and rewrite operations due to an instruction from the management terminal 160 and the NAS manager 706 described later.

<Configuration Example of Disk Control Portion>

The following will describe one example of a configuration of the disk control portion in the storage unit system according to the present embodiment with reference to FIG. 9. FIG. 9 is a diagram showing a hardware configuration of the disk control portion.

As described already, the disk control portion 140 is connected to the storage device 300 and also connected through the connection portion 150 to the CHN 110, so that the disk control unit 140 writes data to and reads it from the storage device 300 either independently or under the control of the CHN 110.

The disk control portion 140 comprises an interface portion 141, a CPU 142, a memory 143, an NVRAM 144, and a board-connecting connector 145, which are all formed into an integral unit.

The interface portion 141 is equipped with: a communication interface for communicating with the channel control portion 110 etc. via the connection portion 150; a communication interface for communicating with the storage device 300; and a communication interface for communicating with the management terminal 160 via the internal LAN 151.

The CPU 142 controls the entirety of the disk control portion 140 and communicates with the channel control portion 110 as well as the storage device 300 and the management terminal 160. By executing the various programs stored in the memory 143 or the NVRAM 144, functions of the disk control portion 140 of the present embodiment are realized. The functions realized by the disk control portion 140 include control of the storage device 300 and the RAID, replication management and control of the data stored in the storage device 300, and control on remote copy.

The NVRAM 144 is a no-volatile memory for storing a program that controls the CPU 142. Contents of the program stored in the NVRAM 144 can be subject to write and rewrite operations in accordance with an instruction from the management terminal 160 or the NAS manager 706.

Further, the disk control portion 140 is equipped with the board-connecting connector 145. When the board-connecting connector 145 is connected to a connector on the side of the storage device control unit 100, the disk control unit 140 is electrically connected to the storage device control unit 100.

<Software Configuration Example>

The following will describe an example of a software configuration in the storage unit system according to the present embodiment with reference to FIG. 10. FIG. 10 is a diagram showing a software configuration in the storage unit system.

As described already, on the CHN 110, the CPU 112 and the I/O processor 119 exist. The CPUs 112 and the I/O processors 119 may be provided one or more, respectively. the CPU 112 operates as an NAS server when an OS 701 and various applications such as the NAS manager 706 are executed in the CPU 112. In the I/O processor 119, a microprogram serving as a controller operates. At the disk control portion 140, an RAID control portion 740 operates in the CPU 142.

In the management terminal 160, the CPU 161 operates as a network boot server 703. The network boot server 703 transfers a mini-kernel 704, and an OS image 705, etc. from the recording medium 167 or the storage unit 168 through the internal LAN 151 to the CPU 112 on the CHAN 110. The network boot server 703 has, for example, a Dynamic Host Configuration Protocol (DHCP) server to assign an IP address or an MAC address to the CPU 112, the CPU 161, and the I/O processor 119, thereby transferring data between the management terminal 160 and each of the CPU 112, the CPU 161, and the I/O processor 119. To boot a network, for example, the CPU 112 makes a request as a client to the network boot server 703 for DHCP, and file transfer, etc. The CPU 112 operates the mini-kernel 704 in the CPU 112 through a procedure for network booting. Finally, the CPU 112 causes the OS image 705 to be installed in the storage device 300 via the I/O processor 119.

Note that FIG. 10 is a diagram explicitly showing also a software configuration of the information processing apparatus 200. The information processing apparatus 200 may have a network file system (NFS) 711 or a common Internet file system (CIFS) 713. The NFS 711 is a file-sharing protocol which is mainly used in an UNIX (Registered Trademark) base operating system 714 and the CIFS 713 is a file-sharing protocol which is mainly used in a Windows (Registered Trademark) base OS 715.

<Defining Method of System LU and User LU>

As described above, the storage unit system according to the present embodiment comprises: the plurality of storage devices 300 for storing data; the plurality of disk control portions (storage device control portions) 140 for controlling the data write/read operations to the plurality of storage devices 300; the connection portion 150 for connecting to the disk control portion 140; the plurality of CHNs (channel control portions) 110 for receiving a write/read request from the external information processing apparatus (host device) of this storage unit system, converting file-level data sent from the information processing apparatus 200 into block-level data, and transferring it to the plurality of storage devices 300 so that these data pieces may be classified into a plurality of cluster groups; the shared memory 120 in which control information transferred between the plurality of CHNs 110 and the plurality of disk control portions 140 is stored; the cache memory 130 in which data transferred between the plurality of CHNs 110 and the plurality of disk control portions 140 is saved temporarily; and the management terminal 160 for setting a logical configuration of the plurality of storage devices 300.

Although details are omitted, in such a configuration, a system LU which is a storage region for storing control information in this storage unit system and a user LU which is a storage region for writing therein write data sent from the information processing apparatus 200 can be set in a plurality of LDEVs which is a logical storage region of the plurality of storage devices 300, the management terminal 160 specifies the system LU or the user LU in order to set path definition for the plurality of LDEVs, and the plurality of CHNs 110 inhibits the information processing apparatus 200 from accessing the system LU according to distinction between the system LU and the user LU specified by the management terminal 160.

Furthermore, in the plurality of LDEVs of the plurality of storage devices 300, a backup LU which is a storage region for backing up control information stored in the system LU can be set, so that a path of the system LU is automatically defined for the backup LU to back up control information stored in the system LU for the backup LU. Specifically, a function to automatically define the path of the system LU can be realized by a combination of the management terminal 160 and the CHN 110, the CHN 110, or the management terminal 160.

In particular, in the storage unit system of the present embodiment, the definition and the function of the system LU and the user LU as viewed from LUN management software (LUN Management) which is connected through the internal LAN and exists in the storage unit system or the management terminal installed outside a frame can be realized as follows.

Only host groups #00 and #01 of host groups are defined as default by the management terminal 160 so that they may not be changed or deleted. Further, a new host group may not be added either. Host group 300 fixes NAS-Sys as a name and means a system LU. Host group #01 fixes User as a name and means a user LU.

<Outline of LUN Definition>

Figure 11:
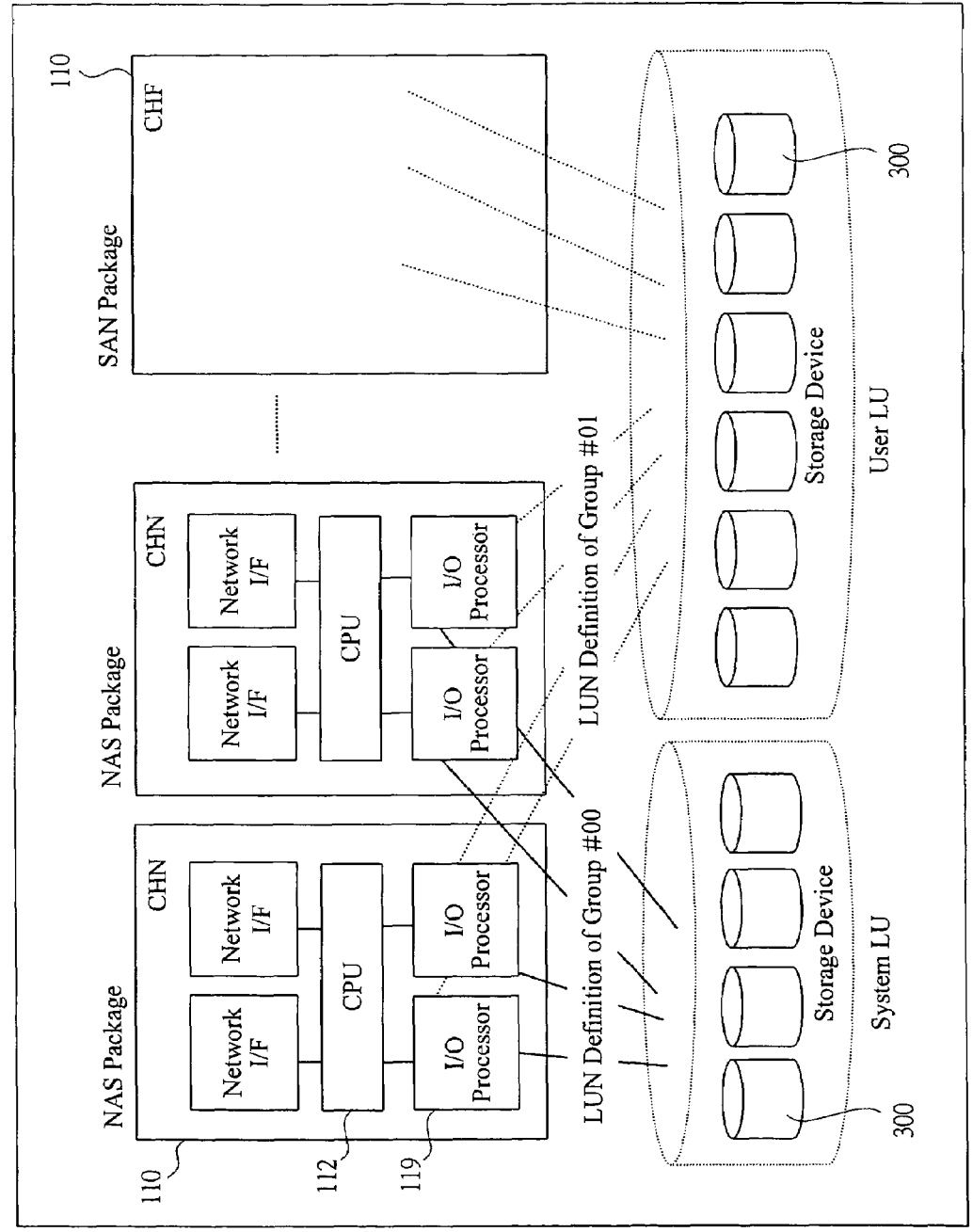
FIG. 11 is a diagram showing an outline of an LUN definition in the storage unit system according to the one embodiment of the present invention.

The following will describe one example of an outline of an LUN definition in the storage unit system according to the present embodiment with reference to FIG. 11. FIG. 11 is a diagram showing an outline of an LUN definition in the storage unit system.

For example, in the storage unit system having the pluralities of NAS-package CHNs 110, and SAN-package CHN 110, the storage device 300, etc. as shown in FIG. 11, an LU which is set to the storage device 300 may be a system LU to be used for control of the CHN 110 or a user LU accessible from the information processing apparatus 200; in either case, the LU is each correlated with the CHN 110. With this, the CHN 110 is each assigned an accessible LU.

To host group #00, an access path to a system LU is defined. An LUN of this host group #00 provides a setting of the system LU, so that the user or a maintenance man sets LUN #00, 01, 05, 06, 08, 0A, 4B, 4C, and 4D and, further, as the system LU of the NAS packages, LUN #0B, 0C, 0D, 0E, 0F, 10, 12, 1B, 1C, 1D, 1E, 1F, 20, 22, 2B, 2C, 2D, 2E, 2F, 30, 32, 3B, 3C, 3D, 3E, 3F, 40, and 42 are automatically set. It is permitted to set a command device to LUN #05 of host group #00. In host group #00, setting of a command device to any other LUN # is invalidated. Details of this system LU are described later.

Further, to host group #01, an access path to a user LU is set. An LUN of this host group #01 provides a setting of the user LU. The LUN of host group #01 permits setting of a command device to any LUN. Details of this user LU are described later.

In the storage unit system of the present embodiment, in order to guarantee a high availability, a plurality of CHNs can be combined as one suite to complement each other in operation. A unit of operations given by this plurality of CHNs is referred to as a cluster. The CHNs belonging to a cluster share a path to LUs in which user data is stored, so that an appropriate one of the LUs can be accessed even if the user issues a request to any one of the CHNs from a client. However, definition of a path is information which is recognized by a controller micro-program of the I/O processor in the storage unit system, so that to permit the OS to access this LU, it is necessary to mount a file system. If the path is not defined yet, existence of this LU is not transmitted from the controller micro-program to the OS, so that it cannot be mounted; if the path is defined, on the other hand, when the OS makes an inquiry to the controller micro-program, the controller micro-program can transmit the existence of this LU to the OS.

That is, to permit the OS to access this LU, first the existence of this LU needs to be posted from the controller micro-program when the controller micro-program has defined an access path to this LU and the OS has inquired the controller micro-program for any available devices; furthermore, the OS creates a file system for at least one or, at the maximum, all of those devices posted as being available and then mounts this file system.

It is to be noted that this creation of a file system refers to permitting the OS to access data by specifying a file name or a directory name to such a device, defining a structure of the file or the directory, defining a rule for accessing that structure, and storing these information pieces in both a system region and a data region. Further, the mounting of a file system refers to registering this file system. A file system can be mounted or canceled by an instruction from the OS. This canceling of mounting is referred to as un-mounting. In the case of the present system, the system region exits in the system LU and the data region exists in the user LU. The OS operates the file or directory structure in accordance with this rule, to access data. This access method is referred to as file system access.

<Roles of Various LUs>

Figure 13:
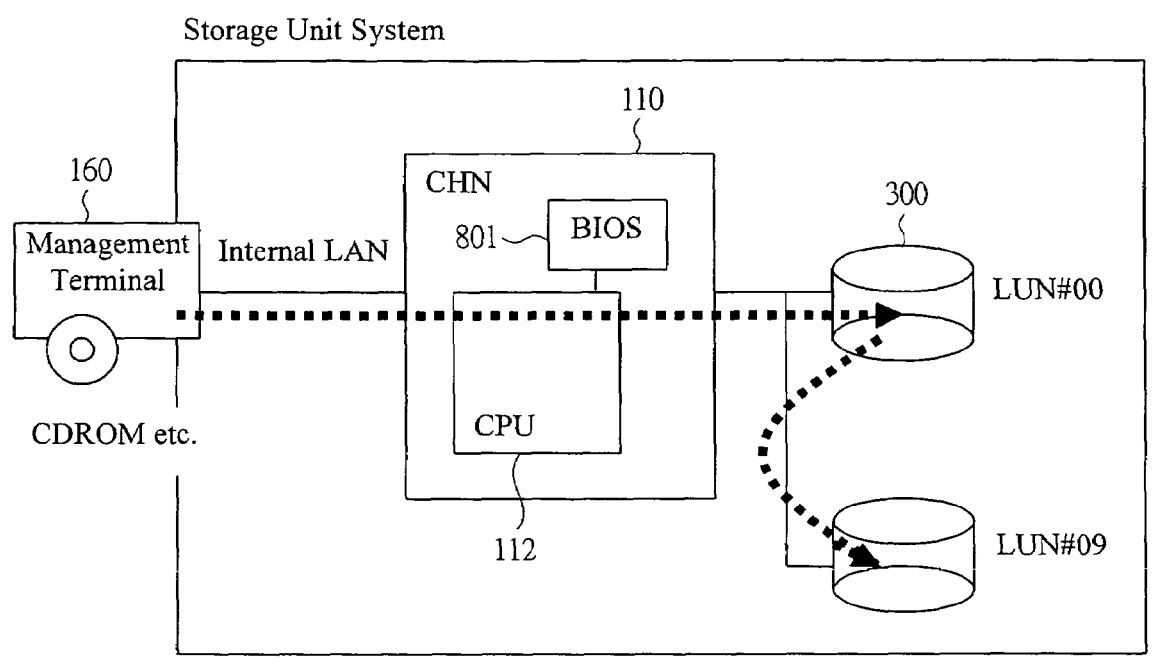
FIG. 13 is a diagram showing a relationship between an OS storing LU and its backup LU in the storage unit system according to the one embodiment of the present invention.
Figure 14:
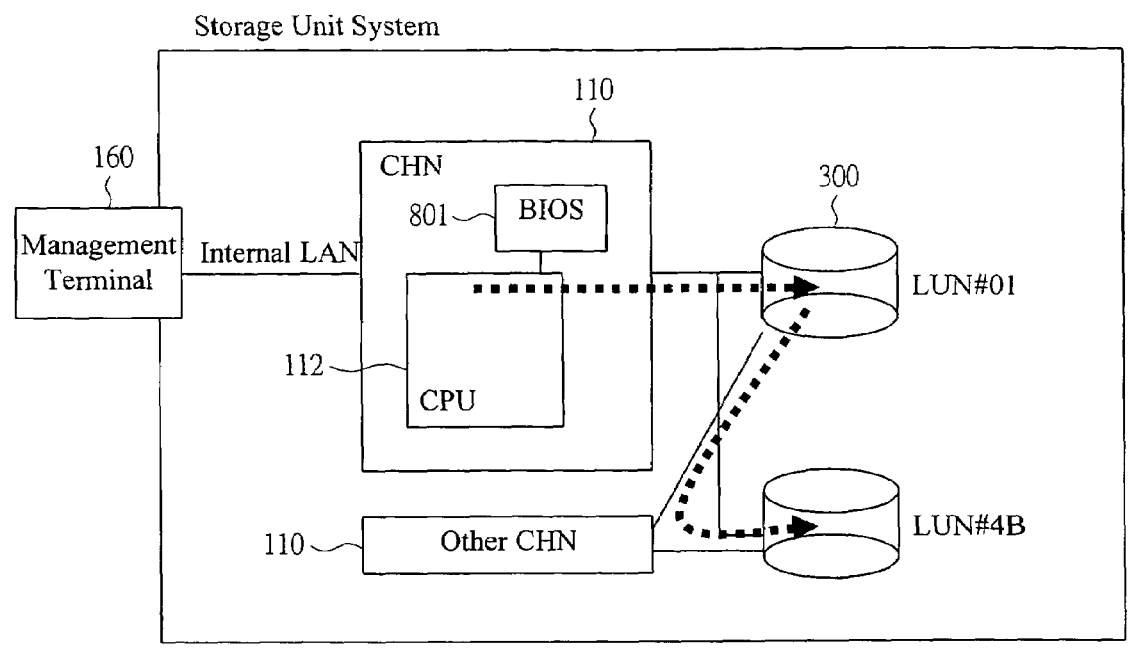
FIG. 14 is a diagram showing a relationship between a dump storing LU and its backup LU in the storage unit system according to the one embodiment of the present invention.
Figure 15:
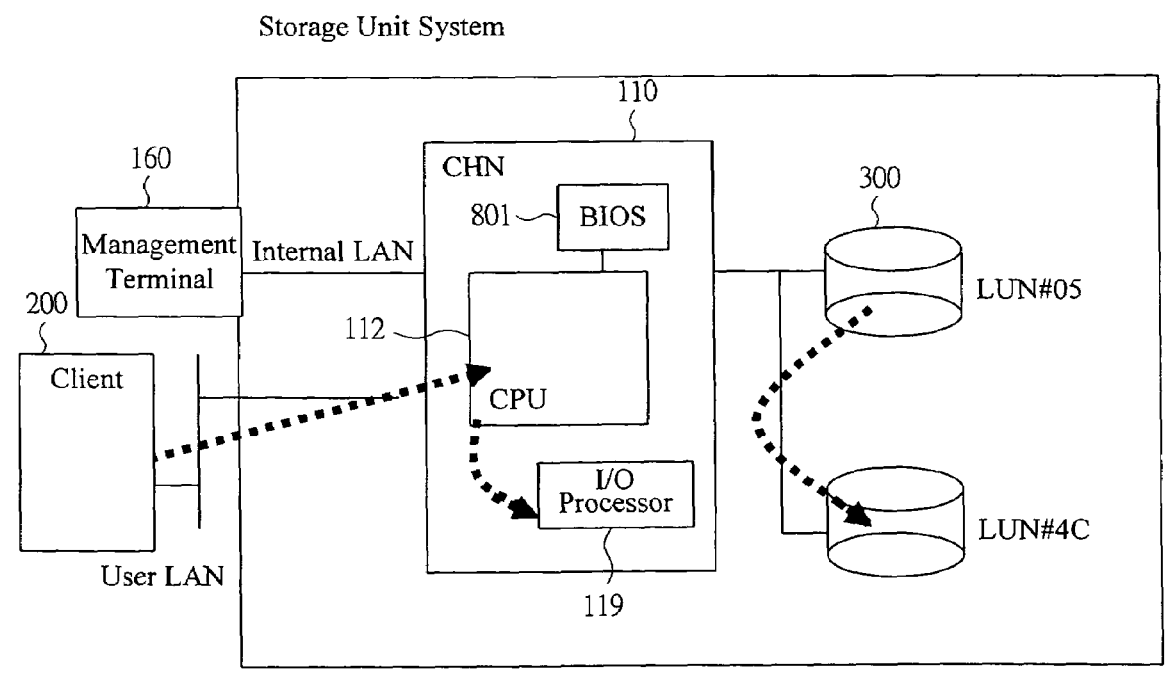
FIG. 15 is a diagram showing a relationship between a command device LU and its backup LU in the storage unit system according to the one embodiment of the present invention.
Figure 16:
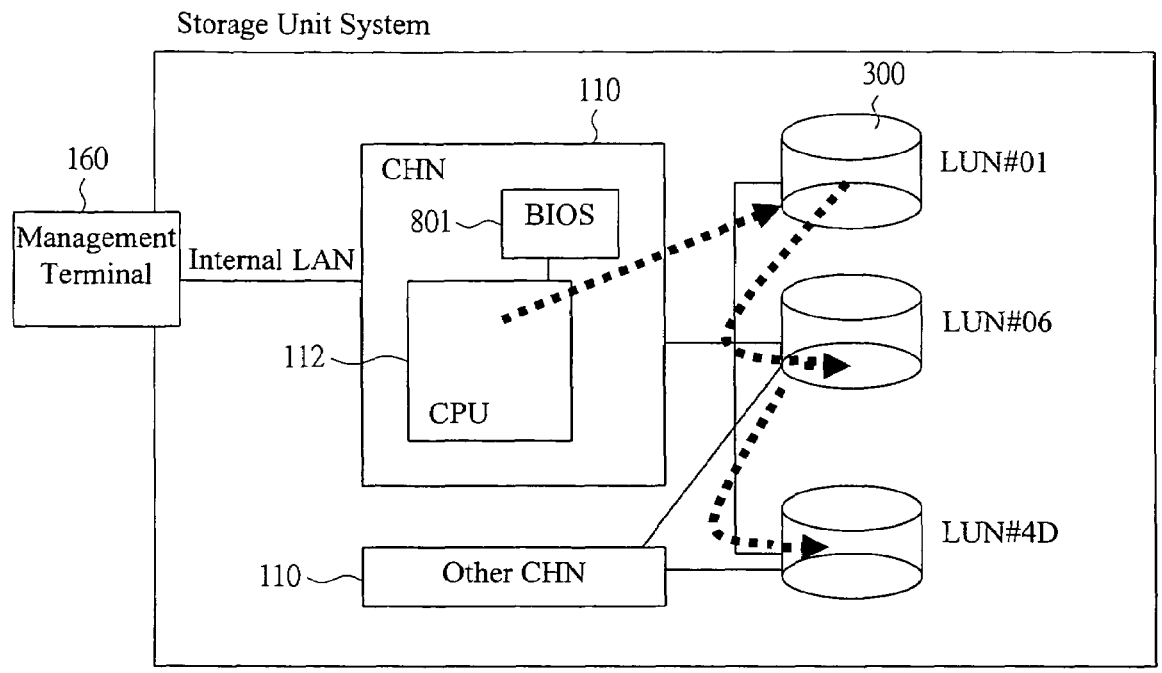
FIG. 16 is a diagram showing a relationship between a fault information storing LU and its backup LU in the storage unit system according to the one embodiment of the present invention.
Figure 17:
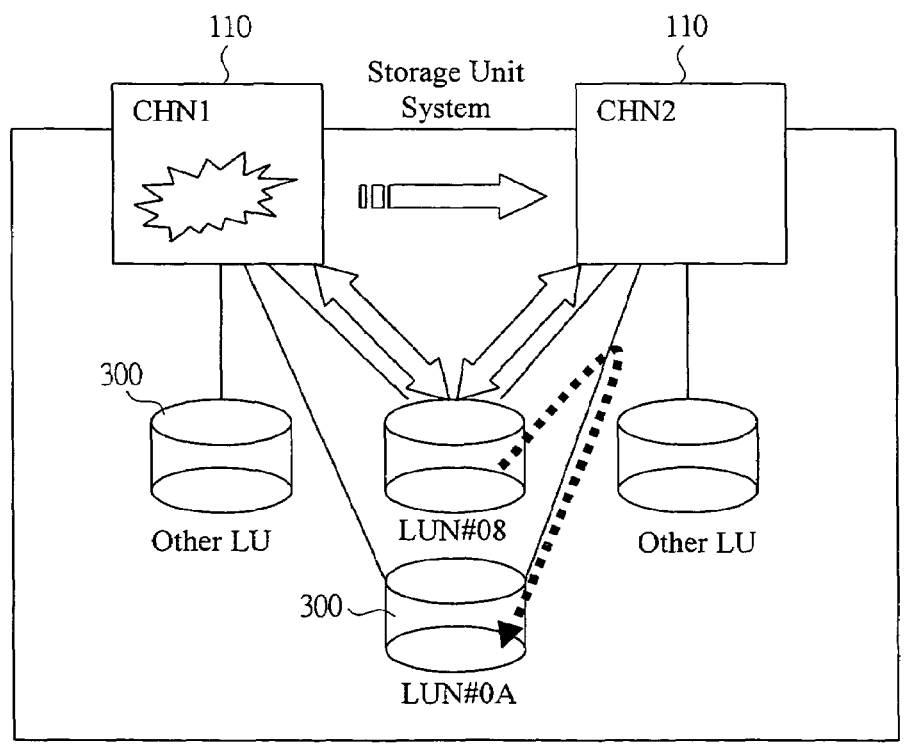
FIG. 17 is a diagram showing a relationship between a cluster information storing LU and its backup LU in the storage unit system according to the one embodiment of the present invention.
Figure 18:
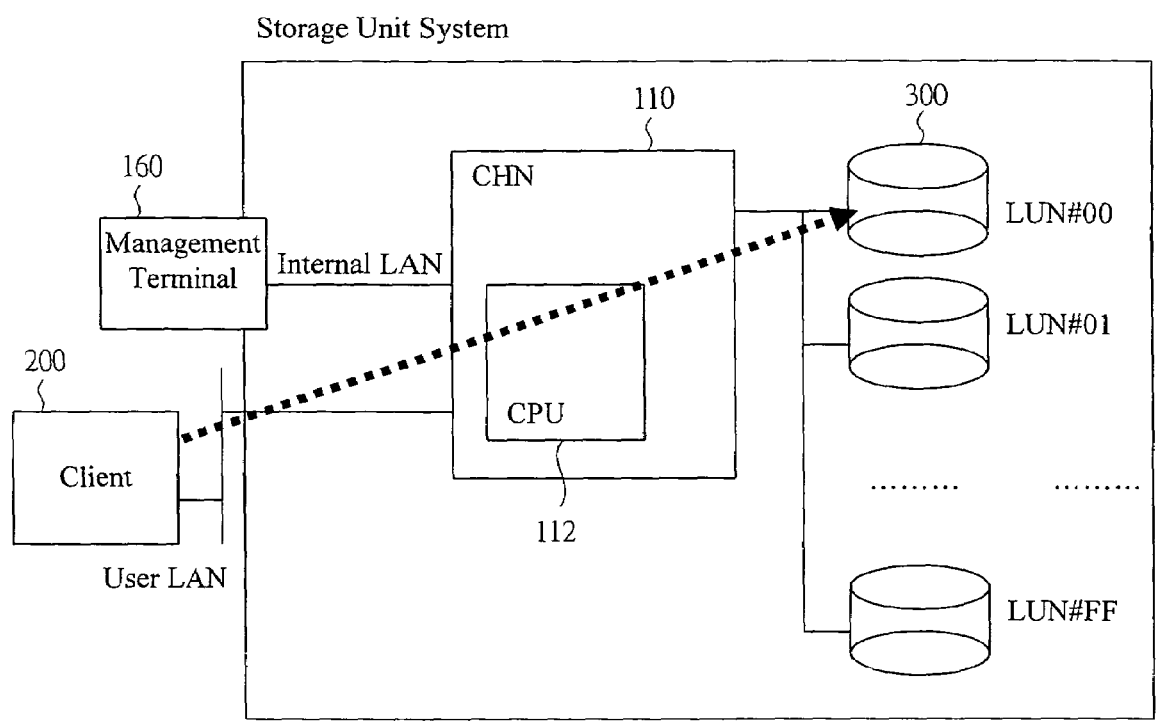
FIG. 18 is a diagram showing roles of a user LU in the storage unit system according to the one embodiment of the present invention.

The following will describe one example of roles of each of the LUs. FIG. 12 is a diagram showing roles of the system LU; FIG. 13 is a diagram showing a relationship between an OS-storing LU and its backup LU; FIG. 14 is a diagram showing a relationship between a dump storing LU and its backup LU; FIG. 15 is a diagram showing a relationship between a command device LU and its backup LU; FIG. 16 is a diagram showing a relationship between a fault information storing LU and its backup LU; FIG. 17 is a diagram showing a relationship between a cluster information storing LU and its backup LU; and FIG. 18 is a diagram showing roles of the user LU.

As shown in FIG. 12, the system LU of host group #00 may be: the OS-storing LU of LUN #00; the command-device LU of LUN #05; the fault information-storing LU of LUN #06; the cluster-shared information storing LU of LUN #08; the backup LU of LUN #0A of the cluster-shared information storing LU; the backup LU of LUN #4B of the dump storing LU; the backup LU of LUN #4C of the command device LU; or the backup LU of LUN #4D of the fault information storing LU.

(1) LUN #00 (OS Storing LU) and LUN #09 (Backup LU of OS Storing LU) . . . FIG. 13

In LUN #00 (OS storing LU) of the storage device 300, the OS is first installed from the management terminal 160 via the internal LN over the network. When triggered by power-ON of the CHN 110 (expansion, replacement, software-wise instruction from the management terminal 160, etc.), the BIOS 801 of the CPU 112 due to an OS operation boots the OS stored in LUN #00, which the OS in turn operates in the CPU 112, thus providing functions as a file server. The OS operating in the CPU 112 due to the OS operation backs up stored OS files and their settings in LUN #09 (backup LU of the OS storing LU).

(2) LUN #01 (Dump Storing LU) and LUN #4B (Backup LU of the Dump Storing LU) . . . FIG. 14

If the OS is disabled to continue operating owing to a software fault etc., the BIOS 801 writes data of the entirety or a portion of a memory used by the OS to LUN #01 (dump storing LU) and then stops the OS. Thereafter, to resume services, the OS needs to be restarted. When operating (during ordinary time or after being restarted), the OS backs up contents of LUN #01 into LUN #4B (backup LU of the dump storing LU). Further, if the OS is halted due to a fault etc., the contents of LUN #01 are backed up from another CHN into LUN #4B. A trigger for backup is to be picked up periodically or when instructed to do so by the management terminal 160.

(3) LUN #05 (Command Device LU) and LUN #4C (Backup LU of Command Device LU) . . . FIG. 15

LUN #05 (command device LU) refers to a dummy LU that is required to issue an instruction for a particular application operating on the OS from a client using this particular application. It is required because an LU must be specified by all means in order to issue a command. Therefore, no data exists in a command device itself. When the OS issues to the I/O processor 119 a command for a command device, the I/O processor 119 executes a DKC-specific function such as remote copy in cooperation with the OS. The OS is triggered by an instruction from the management terminal 160 to thereby assign any other LUN that can be used as the command device. In this case, LUN #4C (backup LU of command device LU) does not copy data, to give an image for preparing a preliminary command device, which also may be referred to as a kind of backup.

(4) LUN #06 (Fault Information Storing LU) and LUN #4D (Backup LU of Fault Information Storing LU) . . . FIG. 16

LUN #06 (fault information storing LU) refers to an LU which is prepared in order that mainly another CHN (because an original CHN is assumed to be halted at the time of fault occurrence) may perform processing such as compression on dump data written into the above-mentioned dump storing LU and store its results. A backup of the data after being processed is created from mainly another CHN for LUN #4D (backup LU of fault information storing LU) of another LU.

(5) LUN #08 (Cluster Information Storing LU) and LUN #0A (Backup LU of Cluster Information Storing LU) ... FIG. 17

In an NAS, one CHN package plays a role of one file server. However, when a plurality of CHNs belongs to the same cluster and if one of these CHNs cannot continue its processing owing to a fault, another CHN takes over the processing by logical definition to perform an fail-over operation of continuing a file server service etc. for the client. In this case, as information required to take over the processing, LUN #08 (cluster information storing LU) is defined. In this case, if one to eight CHN packages can be, for example, installed to the storage unit system, a plurality of clusters can be present as mixed in the storage unit system. However, if the cluster information storing LU cannot be used owing to a fault, none of the clusters can perform fail-over operation (when the CHN cannot be used owing to a fault in this condition also, none of the clusters can take over the processing). To avoid this, a backup of a cluster information storing LU is picked up beforehand from an arbitrary CHN during ordinary time for LUN #0A of a specific LU.

As shown in FIG. 18, a user LU of host group #01 refers to an LU which is required for CHN 110 operating as a file server to be opened to a client (information processing apparatus 200) on a user LAN and provide file services. The user can exert his authority to create, view, delete, and replicate a file in this LU. The LU can take on any value of up to a maximum (FF in this case, i.e., 256 in total).

<Definition of System LU>

Figure 20:
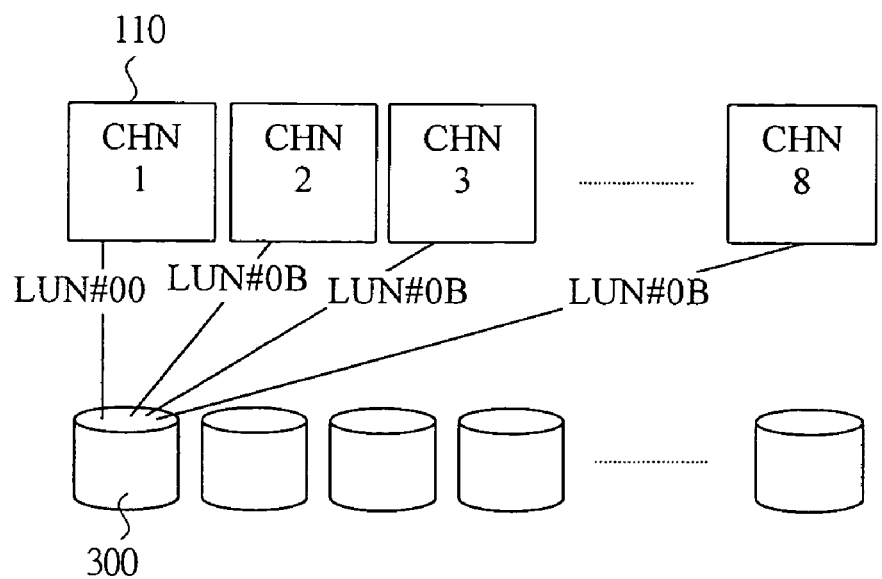
FIG. 20 is a diagram showing an LUN definition for an OS-storing LU in the storage unit system according to the one embodiment of the present invention.
Figure 21:
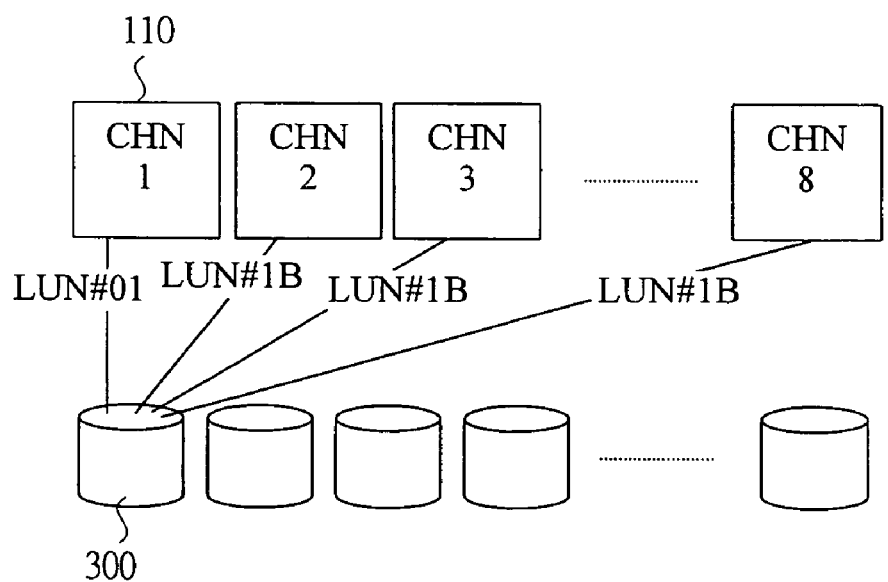
FIG. 21 is a diagram showing an LUN definition for a dump pick-up LU in the storage unit system according to the one embodiment of the present invention.
Figure 22:
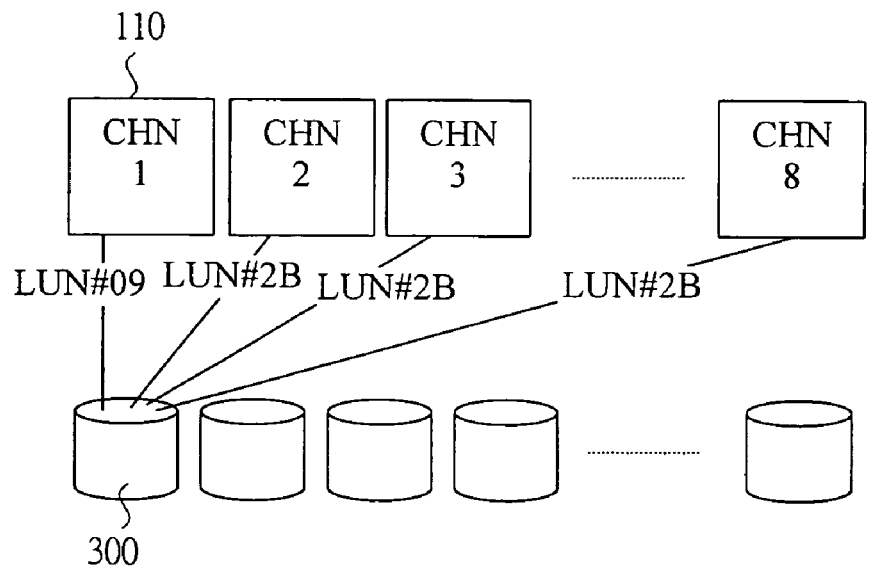
FIG. 22 is a diagram showing an LUN definition for a backup LU of the OS-storing LU in the storage unit system according to the one embodiment of the present invention.
Figure 23:
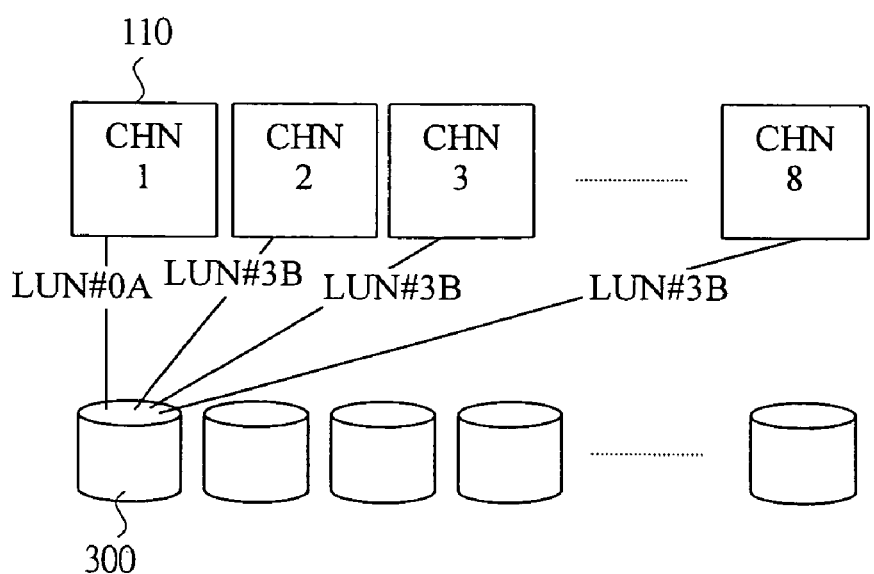
FIG. 23 is a diagram showing an LUN definition for a backup LU of a cluster-shared information storing LU in the storage unit system according to the one embodiment of the present invention.
Figure 24:
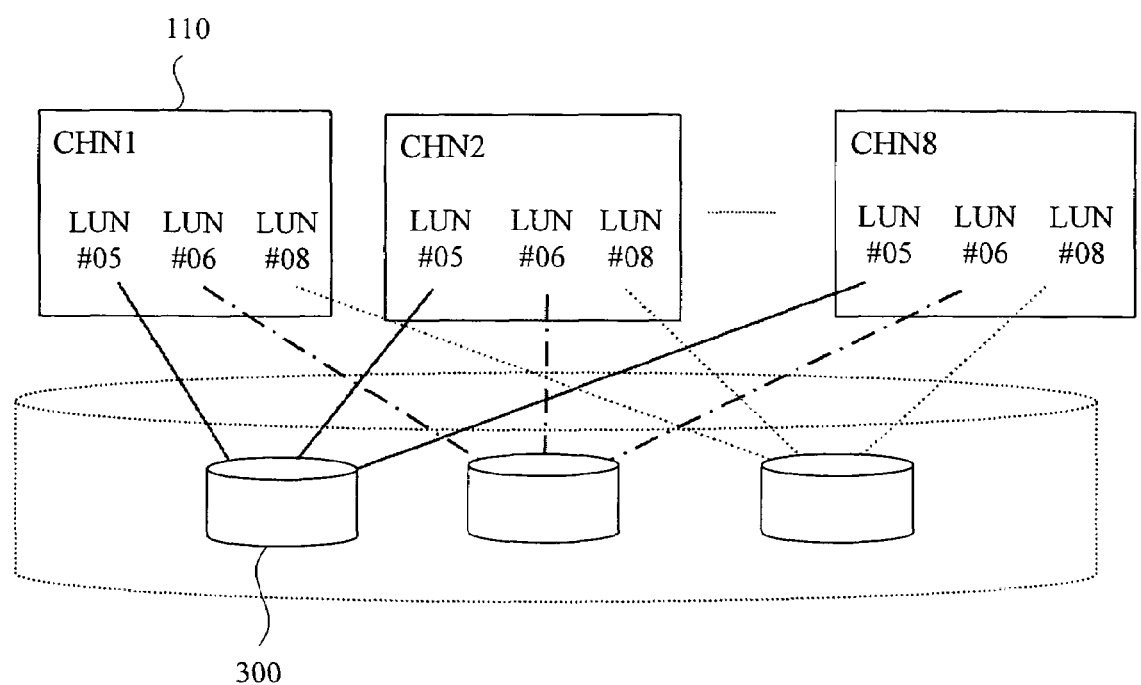
FIG. 24 is a diagram showing an LUN definition for other system LUs in the storage unit system according to the one embodiment of the present invention.

The following will describe one example of definition of a system LU with reference to FIGS. 19 to 24. FIG. 19 is a diagram showing an LUN definition for host group #00; FIG. 20 is a diagram showing an LUN definition for an OS-storing LU; FIG. 21 is a diagram showing an LUN definition for a dump pick-up LU; FIG. 22 is a diagram showing an LUN definition for a backup LU of the OS-storing LU; FIG. 23 is a diagram showing an LUN definition for a backup LU of a cluster-shared information storing LU; and FIG. 24 is a diagram showing an LUN definition for other system LU.

As shown in FIG. 19, a system LU is defined in host group #00. Note that in a system LU, only an LUN definition shown in FIG. 19 is permitted as one example. Further, although a minimum capacity of an LDEV in which an LU can be defined is such as shown in FIG. 19, there are differences in capacity of an LDEV that can be set depending on an individual LU. Note that one to eight CHNs can be, for example, installed in an example of FIG. 19.

Specifically, as one example, LUN #00 has contents of an OS storing LU and a minimum capacity of LDEV of 200 MB. Similarly, LUN #01 is a dump pick-up LU and a capacity of 100 MB, LUN #05 is a command device LU and has a capacity of 50 MB, LUN #06 is a fault information storing LU and has a capacity of 70 MB, LUN #08 is a cluster-shared information storing LU and has a capacity of 60 MB, LUN #09 is a backup LU of an OS storing LU and has a capacity of 200 MB, LUN #0A is a backup LU of a cluster-shared information storing LU and has a capacity of 60 MB, LUN #4B is a backup LU of a command device LU and has a capacity of 100 MB, LUN #4C is a backup LU of a command device LU and has a capacity of 50 MB, and LUN #4D is a backup LU of a fault information storing LU and has a capacity of 70 MB.

Further, LUNs #0B to 12 are used to store the OS and automatically added and deleted depending on whether LUN #00 of CHNs 1 to 8 exists and have a capacity of 200 MB, LUN #1B to 22 are used to pick up a dump and automatically added and deleted depending on whether LUN #01 of CHNs 1 to 8 exists and have a capacity of 100 MB, LUN #2B to 32 are used to back up the OS and automatically added and deleted depending on whether LUN #09 of CHNs 1 to 8 exists and have a capacity of 200 MB, and LUN #3B to 42 are used to back up cluster-shared information and automatically added and deleted depending on whether LUN #0A of CHNs 1 to 8 exists and have a capacity of 60 MB.

In FIG. 19, "automatically added or deleted depending on whether LUN #00 of CHN 1 exists" described in "Contents" means that when the user or the maintenance man issues, from the management terminal, an instruction for defining a path in a relevant package (CHN 1 in this example), the management terminal and the package decide whether a path of LUN#00 is already defined in CHN 1 and, is such is the case, automatically set this LU (LUN #0B in the above-mentioned example) and, otherwise, do not set this LU. Further, in a case where a relevant LU (LUN #0B) is already defined when it is decided that path definition is not performed, this LU is automatically deleted from the path definition. Path definition itself is held in a form of a correlation table between an LUN and an LDEV present in the storage unit system in a non-volatile storage region (memory or hard disk) in the management terminal, a memory in each package, and a shared memory in the storage unit system.

Setting of LUNs #00, 01, 05, 06, 08, 09, 0A, 4B, 4C, and 4D is permitted. Further, setting of a device (LDEV) for which an access path is already defined is not permitted.

LUNs #0B to 12, LUNs #1B to 22, LUNs #2B to 32, and LUNs #3B to 42 are to be set automatically.

To delete LUN #00, related LUNs (#0B to 12) of the other CHNs are also deleted (LUNs #0B to 12 are deleted when a related OS storing LU is deleted).

To delete LUN #01, related LUNs (#1B to 22) of the other CHNs are also deleted (LUNs #1B to 22 are deleted when a related dump pick-up LU is deleted).

To delete LUN #09, related LUNs (#2B to 32) of the other CHNs are also deleted (LUNs #2B to 32 are deleted when a backup LU of an OS storing LU is deleted).

To delete LUN #0A, related LUNs (#3B to 42) of the other CHNs are also deleted (LUNs #3B to 42 are deleted when a backup LU of a cluster-shared information storing LU is deleted).

LUNs #05, 06, 08, 4B, 4C, and 4D are assigned the same LDEVs as the other CHNs 05, 06, 08, 4B, 4C, and 4D. Specifically, once LUNs #05, 06, 08, 4B, 4C, and 4D are assigned to an LDEV for a network I/F on the same CHN, it is indicated that only this LDEV can be selected when performing assignment on other CHNs.

To LUN #05, a command device is set. If a command device is yet to be set, it is set.

To delete a system LU, a user LU must not exist; if it exists, deletion of the system LU by the management terminal fails, resulting in an error. This is done so in order to prevent a system indispensable to access user data such as the OS from being uninstalled in a condition where the user data exists. However, deletion of a backup of the system LU may be permitted even in a condition where a user LU exists.

(1) OS Storing LU

As shown in FIG. 20, LUNs #0B to 12 of group #00 in the storage unit device 300 are automatically set when LUN #00 of each CHN 110 is determined. Further, to delete LUN #00 (LUN #00 of CHN 1 in the figure), LUNs (which indicate LUN #0B of CHNs 2 to 8 in the figure) set in the other CHNs 110 are also deleted. However, to delete LUN #00, existence of a user LU is not to be permitted (If a user LU exists, LUN #00 cannot be deleted). It is to be noted that in each CHN, groups #00 of two network I/Fs perform completely the same LUN definition. Further, LUN #0B of CHN 1 is yet to be defined.

(2) Dump Pick-up LU

As shown in FIG. 21, LUNs #1B to 22 of group #00 in the storage device 300 are set automatically when LUN #01 of each CHN is determined. Further, to delete LUN #10 (LUN #01 in CHN 1 in the figure), LUNs (which indicate LUN #1B of CHNs 2 to 8 in the figure) set in the other CHNs 110 are also deleted. However, to delete LUN #10, existence of a user LU is not to be permitted (If a user LU exists, LUN #01 cannot be deleted). It is to be noted that in each CHN, groups #00 of two network I/Fs perform completely the same LUN definition. Further, LUN #1B of CHN 1 is yet to be defined.

(3) Backup LU of OS Storing LU

As shown in FIG. 22, LUNs #2B to 32 of group #00 in the storage device 300 are set automatically when LUN #09 of each CHN is determined. Further, to delete LUN #09 (LUN #09 in CHN 1 in the figure), LUNs (which indicate LUN #2B of CHNs 2 to 8 in the figure) set in the other CHNs 110 are also deleted. However, to delete LUN #09, it is possible to set so that existence of a user LU may not be permitted (If a user LU exists, LUN #09 cannot be deleted) or may be permitted. It is to be noted that in each CHN, groups #00 of two network I/Fs perform completely the same LUN definition. Further, LUN #2B of CHN 1 is yet to be defined.

(4) Backup LU of Cluster-shared Information Storing LU

As shown in FIG. 23, LUNs #3B to 42 of group #00 in the storage device 300 are set automatically when LUN #0A of each CHN is determined. Further, to delete LUN #0A (LUN #0A in CHN 1 in the figure), LUNs (which indicate LUN #3B of CHNs 2 to 8 in the figure) set in the other CHNs 110 are also deleted. However, to delete LUN #0A, it is possible to set so that existence of a user LU may not be permitted (If a user LU exists, LUN #0A cannot be deleted) or may be permitted. It is to be noted that in each CHN, groups #00 of two network I/Fs perform completely the same LUN definition. Further, LUN #3B of CHN 1 is yet to be defined.

(5) Other System LUs (Command Device LU, Fault Information Storing LU, Cluster-shared Information Storing LU, Backup LU of Dump Storing LU, Backup LU of Command Device LU, Backup LU of Fault Information Storing LU)

If LUNs #05, 06, 08, 4B, 4C, and 4D (only LUNs 05, 06, and 08 of them are shown in the figure) in the storage device 300 are determined in one CHN 110 as shown in FIG. 24, LUNs #05, 06, 08, 4B, 4C, and 4D of the other CHNs 110 are to be assigned to the same LDEV. It is to be noted that to delete LUNs #05, 06, 08, 4B, 4C, and 4D, existence of a user LU is not to be permitted (if a user LU exists, LUNs #05, 06, 08, 4B, 4C, and 4D cannot be deleted). Further, only an LUN of a selected package is to be deleted. It should be noted that it is necessary to set a command device to an LDEV assigned to LUN #05. If a command device is not set, it is set, and if an LDEV to which a command device is set is selected, it is left as it is. It is to be noted that it is permitted to set a command device to and release it from an LDEV which is assigned to LUN #05.

<Processing for Path Definition of Backup LU>

Figure 25:
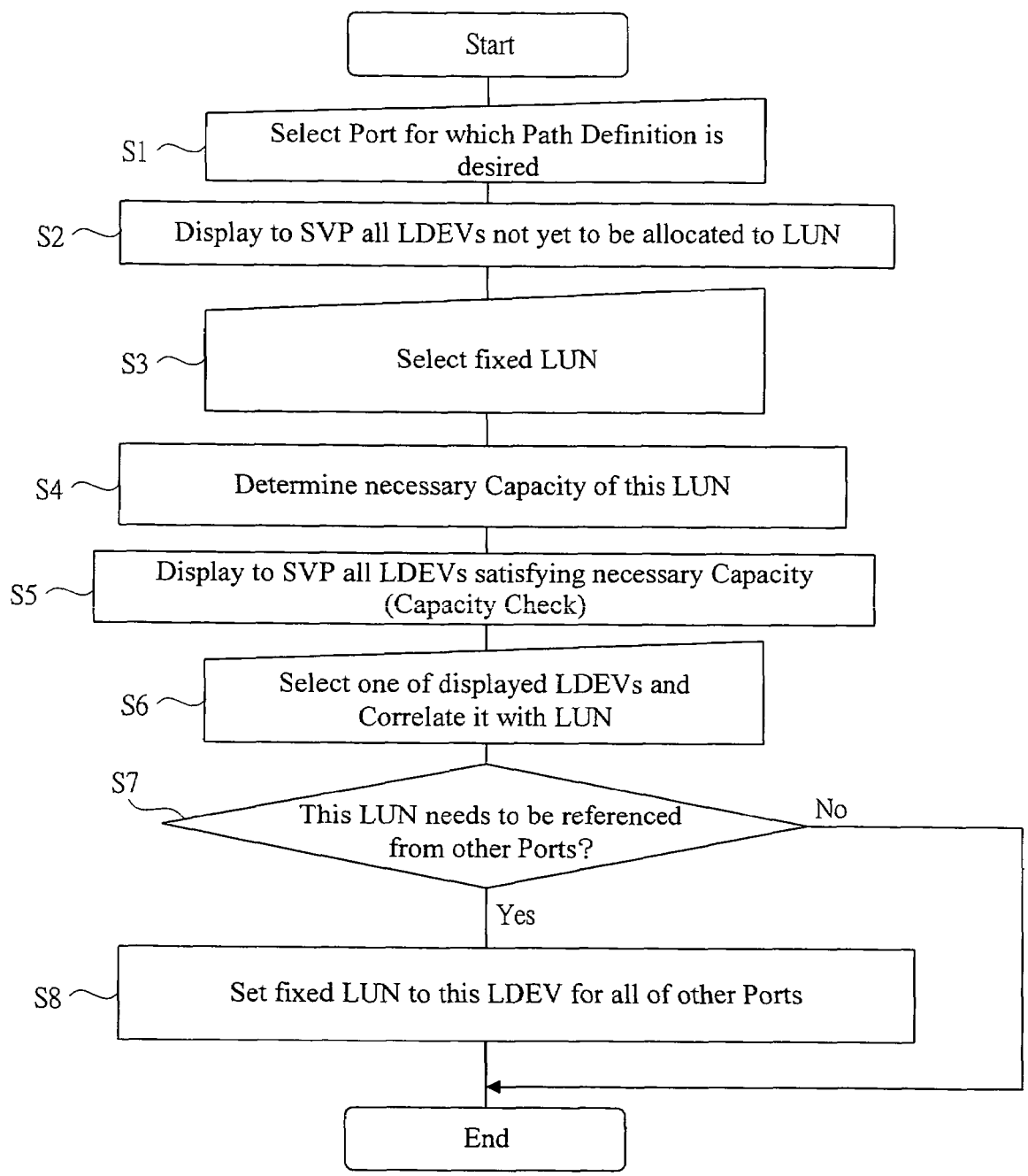
FIG. 25 is a flowchart showing a processing for a path definition of a backup LU in the storage unit system according to the one embodiment of the present invention.

The following will describe one example of processing for defining a path of a backup LU with reference FIG. 25. FIG. 25 is a flowchart for showing a processing for a path definition of a backup LU.

It is here assumed that the user enters data on a screen of the management terminal (written as SVP also) 160. An LDEV refers to a disk drive image logically held in an RAID in the storage device 300. An LU, on the other hand, refers to a logical disk drive image that can be recognized by an NAS engine and a client and an LUIN indicates an LUN number. When the SVP specifies an LDEV to be assigned to an LUN, a logical drive in an RAID can be recognized by the NAS engine and the client.

After start, first the user selects a port for which path definition is desired (S1). This causes all LDEVs not yet assigned to an LUN to be displayed at the SVP (S2). Then, the user selects a fixed LU (S3). This fixed LU has a shade of meaning as a backup LU and determined in as specifications. With this, a necessary capacity of this LUN is determined (S4). For example, in the case of a backup of an OS storing LU, a capacity of 200 MB is necessary. All LDEVs that satisfy this necessary capacity are displayed at the SVP (S5). In this case, the capacity is checked.

Furthermore, the user selects one of these displayed LDEVs and relates it to the LUN (S6). This causes this LUN to be decided whether it needs to be referenced by other ports also (S7). If is it decided that the LUN needs to be referenced (Yes), a fixed LU is set to this LDEV for all of the other ports and the processing ends (S8). This fixed LUN has a meaning to be "a path to a backup LU of another port" and is determined in specifications beforehand. Further, decision comes up with non-necessity of referencing (No), the processing ends.

<Processing for Path Definitions of Various LUs Plus Backup LUs by SVP-and-NAS Blade-led Method>

Figure 27:
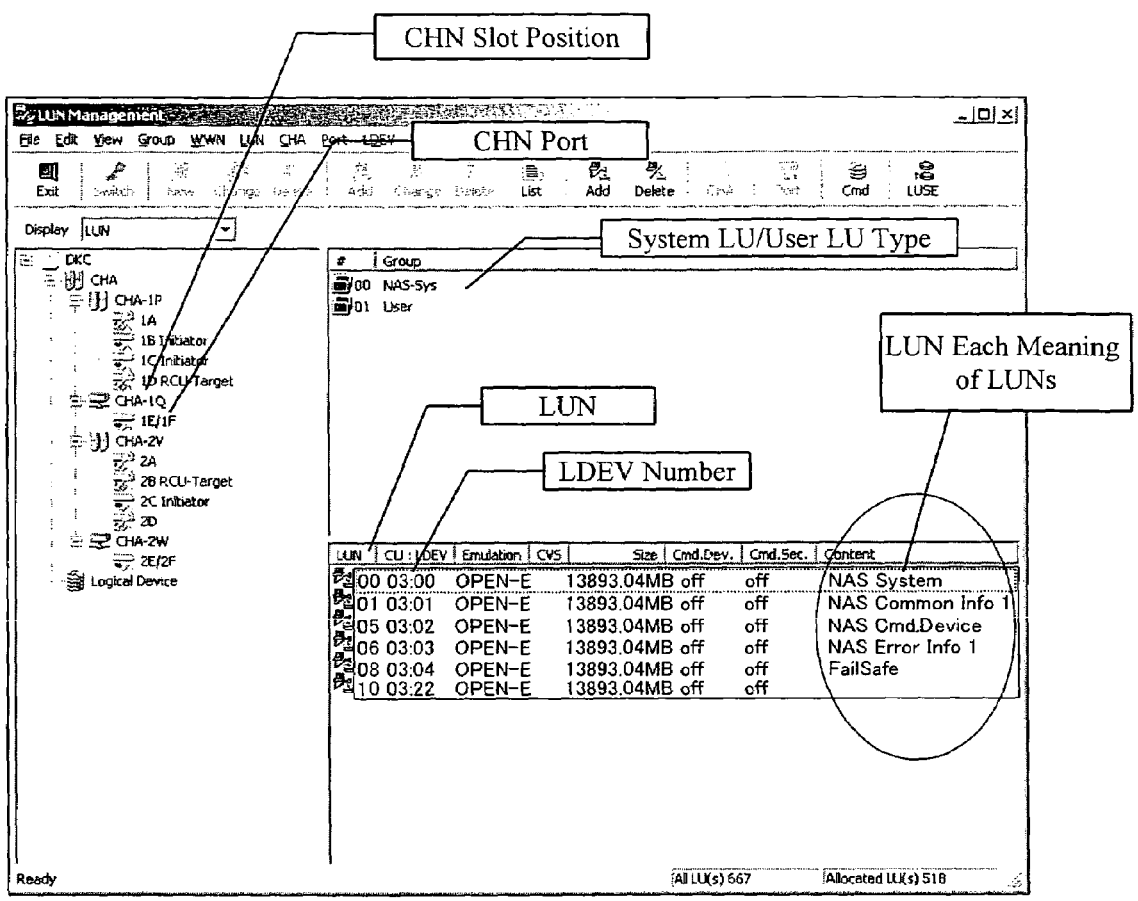
FIG. 27 is a diagram showing a basic screen of a management terminal in the storage unit system according to the one embodiment of the present invention.
Figure 28:
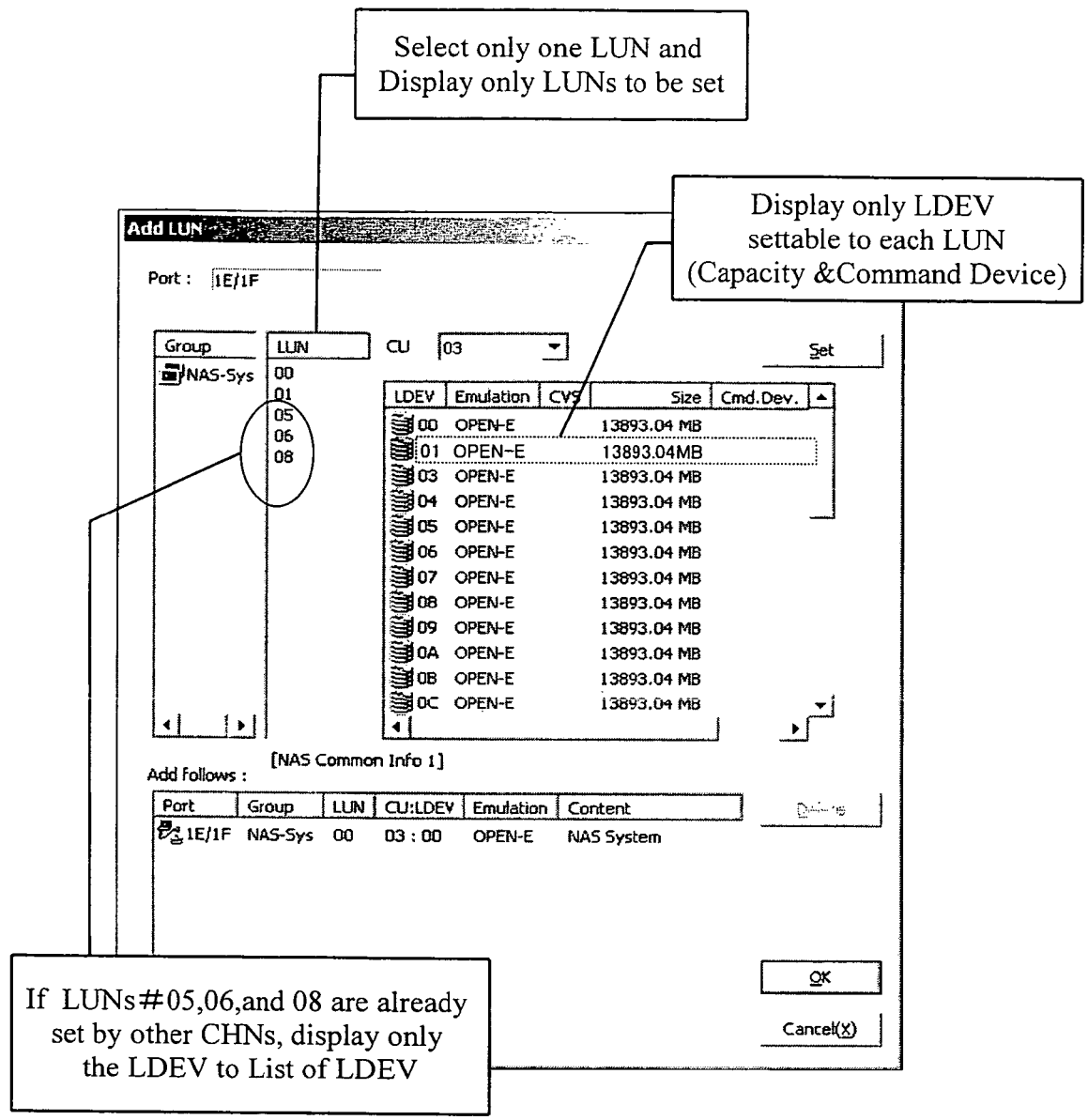
FIG. 28 is a diagram showing an LUN-addition screen of the management terminal in the storage unit system according to the one embodiment of the present invention.

The following will describe one example of processing for path definitions of various LUs plus backup LUs by an SVP-and-NAS blade-led method with reference to FIGS. 26 to 28. FIG. 26 is a flowchart for showing processings for path definitions of various LUs plus backup LUs by the SVP-and-NAS blade-led method; FIG. 27 is a diagram showing a basic screen of the management terminal; and FIG. 28 is a diagram showing an LUN-addition screen of the management terminal. Note that hereinafter the management terminal is written as the SVP and the NAS package, as the NAS blade.

Items to be displayed to the SVP 160 in this processing include, for example, (1) slot position of CHN, (2) port of CHN, (3) flag indicating either system LU or user LU (e.g., LU type), (4) list of LUs that can be set, (5) meanings of LUNs that can be set (e.g., OS storing LU, OS backup LU, etc.), (6) list of available LDEVs (including LDEV size), etc. such as shown on the basic screen of FIG. 27 or the LUN-addition screen.

Further, items to be input from the SVP 160 include (1) selection of slot position of CHN, (2) selection of CHN port, (3) selection of either system LU or user LU, (4) selection of one of LUNs that can be set, (5) selection of one of LDEVs that are thus displayed and can be set, etc.

Specifically, in an example of the basic screen of FIG. 27 are provided a region to give a hierarchical display of apparatuses in the storage unit system (DKC), a region to display host groups, a region to display LUNs, etc. In the host group display region, host group #00 (NAS-Sys) and host group #01 (User) are displayed. That is, a type of a system LU/user LU is displayed. In the LUN display region are provided regions such as LUN, CU: LDEV, Emulation, CVS, Size, Cmd.Dev, Cmd.Sec, and Content, which can be set and released by the maintenance man.

In an example of the LUN-addition screen of FIG. 28 are provided a region to display host groups, a region to display LUNs, a region to display LDEVs, etc. In the LUN display region, each LUN# is displayed, so that only one LU is selected at a time and only LUNs to be set are displayed. If an LUN is already set to another CHN, only its LDEV is displayed on an LDEV list. In the LDEV display region are provided regions such as LDEV, Emulation, CVS, Size, and Cmd.Dev. A capacity and a command device of only LDEVs to which each LUN can be set are displayed.

The following will describe an actual processing procedure based on the items displayed to the SVP 160 and the items input from the SVP 160 with reference to FIG. 26.

First the user selects a port for which path definition is desired (#1). With this, a list of LUNs that can be set to this port is displayed to the SVP (#2). The user selects a LUN (system LU) for which path definition is desired (#3). With this, a list of LDEVs that can be set to this LUN is displayed to the SVP (#4). In this case, only such LDEVs in an RAID as to meet capacity check conditions are displayed.

Furthermore, the user selects one of the LDEVs that can be set to the LUN (#5). With this, the SVP assigns the selected LDEV to this LUN (#6). This completes setting for one system LU. It is to be noted that if there are any other LUs, the above processing is repeated for each of these necessary LUs (#7).

Subsequently, the user selects an LUN (backup LU of the system LU) for which path definition is desired (#8). With this, a list of LDEVs that can be set to this LUN is displayed to the SVP. In this case, only such LDEVs in the RAID as to meet the capacity check conditions are displayed.

Furthermore, the user selects one of the LDEVs that can be set to the LUN (#10). With this, the SVP assigns the selected LDEV to this LUN (#11). This completes setting for one backup LU of the system LU. It is to be noted that if there are any other LUs, the above processing is repeated for each of these necessary LUs (#12).

Then, the SVP posts a suite of these set LUN and LDEV in a format of a table to all of NAS blades (#13). In this case, it posts also that the set LUN is a system LU. With this, in an NAS blade, the I/O processor (hereinafter written as IOP) allocates a backup LU of a system LU under the control of another NAS blade of the set LUNs to an LUN that has a shade of meaning of "backup LU under the control of other NAS blade/port" in its own table (#14). In this case, the LU must have properties required to be referenced by other NAS blade. At this stage, path definition is completed.

Subsequently, in the NAS blade, the IOP notifies the SVP of a table related to the completed LUN-LDEV (#15). Furthermore, the user confirms path definition (#16). Then, the SVP responds to the user with the table related to the completed LUN-LDEV (#17).

<Processing for Definition of Paths of Various LUs Plus Backup LUs by Means of NAS Blade (NASOS)-led Method>

The following will describe one example of processing for definition of paths of various LUs plus backup LUs by means of a NAS blade (NASOS)-led method. FIG. 29 is a flowchart for showing processing for definition of paths of various LUs plus backup LUs by means of the NAS blade (NASOS)-led method.

Items to be displayed to the SVP are the same as those of FIG. 27 (basic screen) and FIG. 28 (LUN-addition screen) in the above-mentioned AVP-and-NAS blade-led method and items to be input from the SVP are the same as those of the above-mentioned SVP-and-NAS blade-led method. The following will describe an actual processing procedure with reference to FIG. 29.

According to this processing procedure, processing from (#21) to (#27) is the same as the above-mentioned processing from (#1) to (#7) and processing from (#37) to (#39) is the same as the above-mentioned processing from (#15) to (#17), so that their description is omitted here and contents of processing from (#28) to (#36) are described below.

After (#27) is finished, the SVP posts a suite of set LUN and LDEV in a format of a table to all of NAS blades (#28). In this case, it posts also that the set LUN is a system LU. With this, in an NAS blade, the IOP extracts such LUn as to need backup of those set LUNs and searches an RAID for LDEVs that have a necessary capacity (#29).

Subsequently, the SVP responds with numbers of LDEVs that meet conditions from a list table of the LDEVs in the RAID (#30). With this, in the NAS blade, it selects one of the LDEVs that meet the conditions and updates an LUN-LDEV correlation table by using it as a backup LU (#31). Furthermore, it stored the updated LU-LDEV correlation table in a shared memory (#32). Then, it sets in the shared memory a flag indicating that the LUN-LDEV correlation table has been updated (#33). Then, the LUN-LDEV correlation table is posted to the SVP (#34).

Subsequently, in the other NAS blades, update of the LUN-LDEV correlation table is detected (#35). In this case, polling is used. Then, the IOP allocates an LU that it should reference of the updated LUNs to an LUN that has a shade of meaning of "backup LU under the control of other NAS blade/port" (#36). At this stage, path definition is completed. Hereafter, processing of (#37) and the subsequent is performed.

<Processing for Definition of Paths of Various LUs Plus Backup LUs by Means of SVP-led Method>

The following will describe one example of processing for definition of paths for various LUs plus backup LUs by means of an SVP-led method with reference to FIG. 30. FIG. 30 is a flowchart for showing processing for definition of paths of various kinds of LUs plus backup LUs by means of the SVP-led method.

In this processing, items to be displayed to the SVP are the same as those of FIG. 27 (basic screen) and FIG. 28 (LUN-addition screen) in the above-mentioned AVP-and-NAS blade-led method and items to be input from the SVP are the same as those of the above-mentioned SVP-and-NAS blade-led method. The following will describe an actual processing procedure with reference to FIG. 30.

According to this processing procedure, processing from (#41) to (#51) is the same as the above-mentioned processing from (#1) to (#11) and processing from (#56) to (#57) is the same as the above-mentioned processing from (#16) to (#17), so that their description is omitted here and contents of processing from (#52) to (#55) are described below.

After (#51) is finished, the SVP decides whether a set LUN needs to be referenced by any other NAS blade (#52). If such is the case, it allocates an allocated LDEV to an LUN that has a shade of meaning of "backup LU under the control of other NAS blade/port" in the LUN-LDEV correlation table under the control of the other NAS blades (port) (#53). In this case, for each LUN or for each slot in which an NAS blade is inserted, each LUN is defined as a fixed value. At this stage, path definition is completed.

With this, setting for one backup LU of the system LU is completed. It is to be noted that if there are other LUs, the above processing is repeated for each of these necessary LUs (#54).

Subsequently, the SVP posts a suite of the set LUN and LDEV in a format of a table to all of NAS blades (#55). In this case, it posts also that the set LUN is a system LU. Then, processing of (#56) and the subsequent is performed.

<Definition of User LU>

Figures 31, 32:
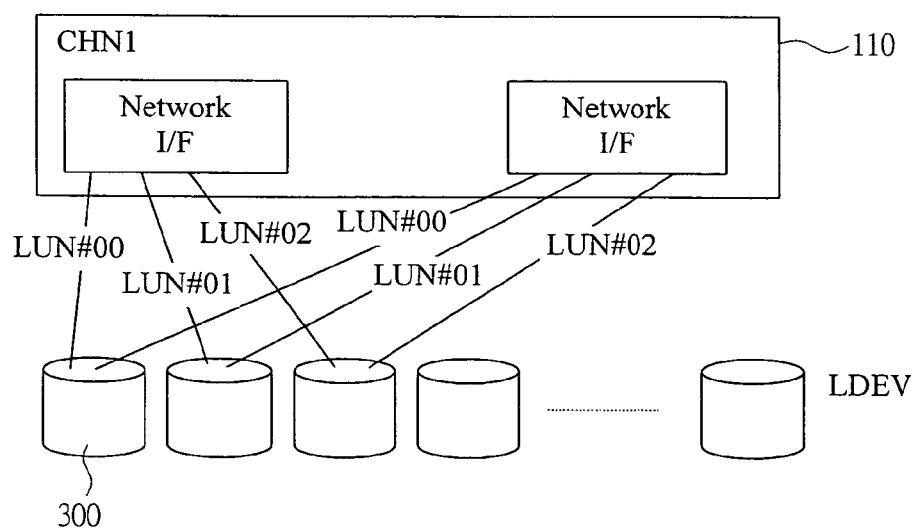
FIG. 31 is a diagram showing an LUN definition for host group #01 in the storage unit system according to the one embodiment of the present invention.
FIG. 32 is a diagram showing an LUN definition for a user LU in the storage unit system according to the one embodiment of the present invention.

The following will describe one example of definition of a user LU with reference to FIGS. 31 and 32. FIG. 31 shows LUN definition for host group #01 and FIG. 32 shows LUN definition for a user LU.

As shown in FIG. 31, in LUN definition for host group #01, an ordinary value of 0 through 255 can be used but no LUN can be defined to an LDEV to which a system LU is already defined. Further, unless an LUN shown in FIG. 31 is defined to host group #00, no LUN can be defined to host group #01. Specifically, LUNs #00 to FF each have contents for a user data LU and a limitless LDEV minimum capacity.

As shown in FIG. 32, in definition of a user LU, as in the case of host group #00, in each CHN 110, groups #01 of the two network I/Fs perform completely the same LU definition. That is, the same LUN is defined to network I/Fs that exits on the same CHN. It should be noted that to set a user LU, it is indispensable to set system LUs (LUNs #00, 01, 05, 06, and 08) of its CHN. (None of the system LUs (LUNs #00, 01, 05, 06, and 08) exists, not user LU can be added). LUNs of host group #01 prepared for user data can be set uninhibitedly as many as 256 starting from LUN #0 as in the case of an SAN environment.

<Module Configuration of Management Terminal and Function Outline>

Figure 33:
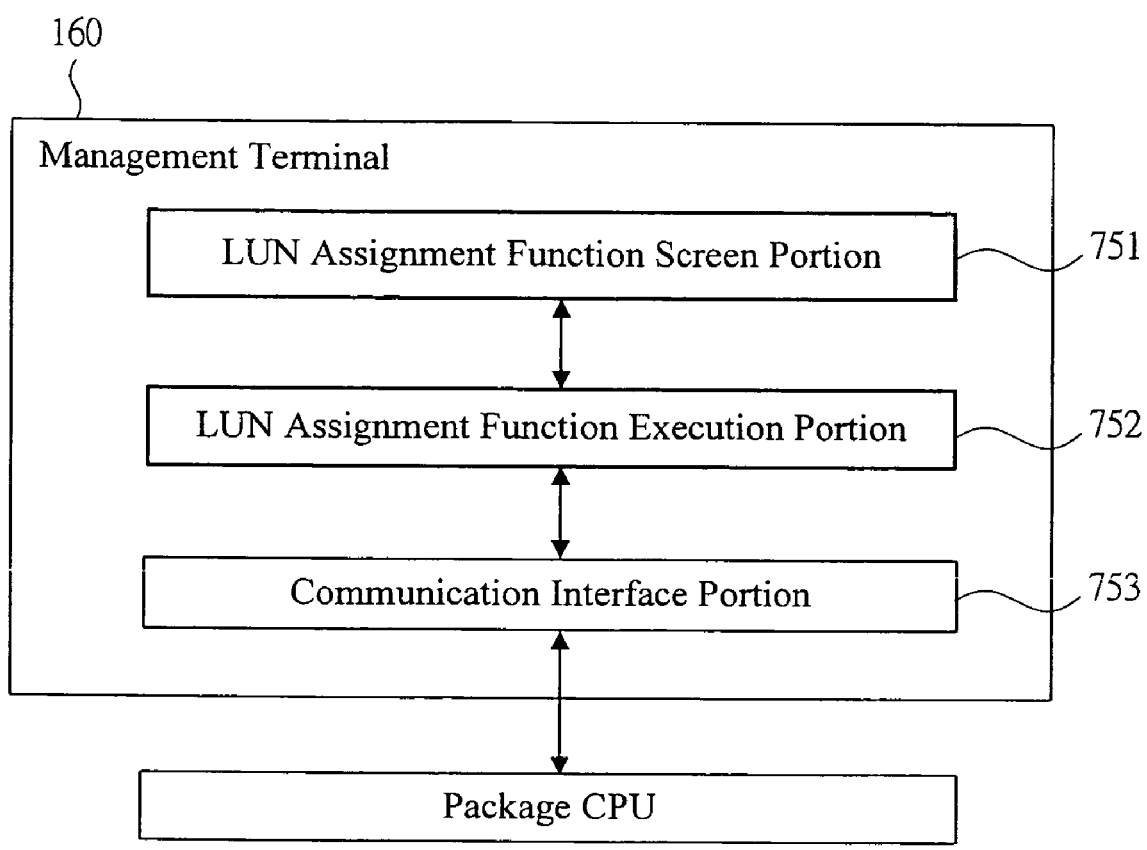
FIG. 33 is a diagram showing a module configuration of the management terminal in the storage unit system according to the one embodiment of the present invention.

The following will describe one example of a module configuration and a function outline of the management terminal with reference to FIGS. 33 and 34. FIG. 33 shows the module configuration of the management terminal and FIG. 34 shows an outline of a function of each module.

As shown in FIG. 33, a configuration of modules which operate in the management terminal 160 comprises an LUN assignment function screen portion (hereinafter simply written as screen portion also) 751, an LUN assignment function execution portion (hereinafter simply written as execution portion also) 752, a communication interface portion 753, etc. This management terminal 160 is connected to a package CPU via the communication interface portion 753 in the management terminal 160. In this management terminal 160, the screen portion 751 and the execution portion 752 provide such processing as given in FIG. 34.

For example, as for host groups, processing for defining group #00 as a default (name: NAS-Sys) and processing for defining group #01 as a default (name: User) are created at the execution portion. Further, processing of a host mode involves no-display and alteration suppression at the screen portion and suppression at the execution portion.

Furthermore, as for LUNs, processing for adding a path in group #00 is permitted at the screen portion to add paths for LUNs #00, 01, 05, 06, 08, 09, 0A, 4B, 4C, and 4D. Further, processing for deleting a path is permitted at the screen portion to behave based on an error command from the execution portion and inhibited at the execution portion in an condition where there is a user LU. Furthermore, processing for conventional command device setting permits setting of LUN #05 at the screen portion so that the other LDEVs may behave based on an error code from the execution portion and is inhibited at the execution portion.

Further, the path adding processing in group #01 is permitted at the screen portion to behave based on an error code from the execution portion and inhibited at the execution portion in a condition where a system LU is yet to be given. Further, processing for deleting a path and the processing for conventional command device setting are permitted at the screen portion and the execution portion respectively.

<Details of LUN Definition>

The following will describe details of definition of an LUN. FIG. 35 is a diagram showing permission/inhibition of setting in an LUN definition.

(1) Permission/inhibition of Setting

LUN setting involves such restrictions as shown in FIG. 36 in setting of conditions of a host group.

For example, if both group #00 (LUNS #00, 01, 05, 06, 08, 09, 0A, 4B; 4C, and 4D) and group #01 are in a condition where there is no LUN, setting of LUN definition to group #00 can be added and deleted but cannot be done so to group #01. Further, in a condition where group #00 has an LUN and group #01 has no LUN, setting of LUN definition to group #00 and group #01 can be added and deleted. Furthermore, in a condition where both group #00 and group #01 have an LUN, setting of LUN definition to group #00 cannot be added or deleted but can be done so to group #01. Further, in a condition where group #00 has no LUN and group #01 has an LUN, there is no setting of LUN definition to group #00 or group #01.

Further, automatically defined LUNs (#0B to 12, #1B to 22, #2B to 32, and #3B to 42) of a system LU can be added and deleted irrespective of path definition of group #01. Furthermore, to delete an LUN of group #00 (system LU) of a relevant CHN owing to a decrease in number of packages, all of LUNs (including automatically set LUNs) of a relevant package are selected and deleted. It is to be noted that to delete a system LU, no user LU of a relevant CHN must exist.

(2) Addition of System LU

Processing contents and checkpoints of each of LUNs# in addition of a system LU are as follows.

For example, in processing of LUN #00, first addition of LUN #00 is requested at the screen portion and the execution portion. In this case, a request is made to a first one of the two ports. Furthermore, an LDEV with no path is caused to be selected at the screen portion and the execution portion so that its capacity may be checked. Subsequently, at the execution portion, related LUs (LUNs #0B to 12) to other CHNs are automatically created and then LUNs (LUNs #0B to 12 and 1B to 22) are automatically created from the other CHNs, to perform path definition to the other port of the same CHN. Processing of LUN #01 is almost the same as that of LUN #00 except that at the execution portion the related LUs (LUNs #1B to 22) to the other CHNs are automatically created and then path definition is performed to the other port of the same CHN.

Further, in processing of LUN #05, at the screen portion and the execution portion, if a system LU is already set at other CHN, first only its LDEV is enabled to be selected and then, similarly, processing from addition requesting to capacity checking is performed. Subsequently, at the screen portion, if no command device is set, a command device is set, and then at the execution portion, path definition is performed to the other port of the same CHN. Processing of LUNs #06, 08, 4B, 4C, and 4D is the same except that command device setting is unnecessary at LUN #05.

Further, processing of LUNs #09 and 0A is the same except that related LUs that are automatically created from the other CHNs after related LUs to other CHNs are automatically created at LUN #00 are different. In processing of LUN #09, related LUNs #2B to 32 to other CHNs are automatically created and then related LUNs #0B to 12, #1B to 22, #2B to 32, and 3B-42 are automatically created from the other CHNs. In processing of LUN #0A, related LUNs #3B to 42 to other CHNs are automatically created and then related LUNs #0B to 12, #1B to 22, #2B to 32, and #3B to 42 are automatically created from the other CHNs.

In this addition of a system LU, a command device is set only to LUN #05. In command device setting to LUN #05, if a command device is already set, it is left as it is. If a command device not set is selected, the screen portion makes a request to the execution portion to set a command device. It is to be noted that command device setting and releasing for LUN #05 can be performed in the same way as for a conventional LDEV.

(3) Deletion of System LU

In deletion of a system LU, processing contents and checkpoints of each of LUNs# are as follows.

For example, in processing of LUN #00, first deletion of LUN #00 is requested at the screen portion and the execution portion. In this case, a request is made to a first one of the two ports. Subsequently, at the execution portion, a path to the other port of the same CHN is deleted and LUs (LUNs #0B to 12) related to other CHNs are also deleted. Processing of LUN #01 is the same except that as LUs related to the other CHNs in LUN #00, LUNs #1B to 22 are deleted.

Further, processing of LUNs #05, 06, 08, 4B, 4C, and 4D is the same except deleting also the LUs related to the other CHNs in LUN #01 becomes unnecessary.

Further, processing of LUNs #09 and 0A is the same except that different LUs related to the other CHNs in LUN #01 are also deleted. In processing of LUN #09, related LUNs #2B to 32 of the other CHNs are deleted. In processing of LUN #0A, related LUNs #3B to 42 of the other CHNs are deleted.

Further, in processing of the other LUNs, deletion of an automatically created path of a relevant package is permitted.

In this deletion of a system LU, deletion of an LUN of a relevant package is permitted only when all of the system LUs are selected. To enable deleting a system LU, no user LU must exist in a relevant package.

(4) Addition of User LU

In addition to a user LU, processing contents and checkpoints are as follows.

First, a path is defined at the screen portion and the execution portion. In this case, a request is made to a first one of the two ports. Then, at the execution portion, a path to the other port of the same CHN is also deleted. It is to be noted that definition to an intermediate volume is impossible at the screen portion and the execution portion and path definition without a system LU is impossible either at the execution portion.

(5) Deletion of User LU

In deletion of a user LU, processing contents and checkpoints are as follows.

First, a path is deleted at the screen portion and the execution portion. In this case, a request is made to a first one of the two ports. Then, at the execution portion, a path to the other port of the same CHN is also deleted.

<Effects of the Present Embodiment>

(1) It is possible to provide a storage unit system that can be connected to different kinds of networks such as information processing apparatuses (1) 200 through (3) 200 connected via the LAN 400, information processing apparatuses (3) 200 through (4) 200 connected via the SAN 500, and an information processing apparatus (5) 200 connected not via a network such as the LAN 400 or the SAN 500 and a method to control replication of a system region of a storage device control unit required in such a storage unit system.

(2) It is possible to explicitly separate a system LU and a user LU from each other by setting by a maintenance man or a user from the management terminal 160 etc. That is, to conceal a system LU from a client, the management terminal 160 etc. provides this LU with an interface for defining a path by explicitly specifying a system LU and a user LU. In accordance with distinction between system LUs and user LUs that is set therethrough, a micro-program can manage access for management from an NASOS and data access from the user in a condition where they are separated from each other.

(3) It is possible to automatically define a path and set a decrease in the number of the paths so that a backup LU can be specified only for a system LU and it can be accessed from each package in accordance with a constant policy. That is, to avoid occurrence of an event where an fail-over operation is impossible at all clusters owing to a fault of a system LU, a backup of the system LU is created in the same frame. In this case, to effectively utilize backed up data, such a function is provided as to semi-automatically perform LU path definition from each package in accordance with the constant policy.

Further, a mistake of decreasing the number of paths irrespective of existence of a system can be prevented both for a system LU and a user LU.

As described above, the invention made by the inventors has been concretely described based on the embodiment. However, needless to say, the present invention is not limited to the above-mentioned embodiment and can be variously modified and altered without departing from the gist thereof.

What is claimed is:

1. A disk array device comprising:
a plurality of storage devices for storing data:
a storage device control unit for controlling a data write or read operation to said plurality of storage devices;
a connection portion connected to said storage device control unit; a plurality of channel control portions for receiving a write or read request from an external host device, converting file-level data sent from said host device into block-level data, and transferring it to said plurality of storage devices;
a cache memory temporarily saving data exchanged between said plurality of channel control portions and said storage device control unit; and
a management terminal for setting a logical configuration of said plurality of storage devices,
wherein said channel control portions and said storage device control unit form, based on an instruction from the management terminal, a system LU which is a storage region for storing control information in the disk array device itself, a user LU which is a storage region for writing write data sent from said host device and a backup LU which is a storage region for backing up said control information stored in said system LU,
wherein said channel control portions, said storage device control unit and said management terminal provide a function to automatically define a path of said backup LU with respect to said system LU and to backup the control information stored in said system LU to said backup LU;
wherein the system LU includes an OS storing LU group, a dump pick-up LU group, a command device LU group, a fault information storing LU group, and a cluster-shared information storing LU group,
wherein the backup LU includes a backup LU group of the OS storing LU group, a backup LU group of the cluster-shared information storing LU group, a backup LU group of the dump pick-up LU group, a backup LU group of the command device LU group and a backup LU group of the fault storing information LU group, and
wherein each of the LUs of each of the LU groups of the system LU is coupled to a respective one of the control channel portions so that each of the control channel portions is coupled to a corresponding LU of one of the LU groups, and wherein deleting any one of the LUs of one of the LU groups of the system LU deletes all of the LUs of said one of the LU groups.

2. The disk array device according to claim 1,
wherein said function to automatically define the path of said system LU is realized by said management terminal and said plurality of channel control portions, said management terminal has a function to assign said system LU of which a path definition is desired, to a settable LDEV of a plurality of LDEVs, and said plurality of channel control portions each have a function to automatically define a path of said system LU with respect to said backup LU of said settable LDEV assigned by said management terminal.

3. The disk array device according to claim 1, wherein said function to automatically define the path of said system LU is realized by said plurality of channel control portions, and said plurality of channel control portions each have a function to assign said system LU for which a path definition is desired, to a settable LDEV of a plurality of LDEVs, and to automatically define a path of said system LU with respect to said backup LU of said settable LDEV assigned.

4. The disk array device according to claim 1, wherein said function to automatically define the path of said system LU is realized by said management terminal, and said management terminal has a function to assign said system LU for which a path definition is desired, to a settable LDEV of a plurality of LDEVs, and to automatically define a path of said system LU with respect to said backup LU of said settable LDEV assigned.

5. The disk array device according to claim 1, wherein the control information stored in said system LU is OS information, and said OS information is backed up to said backup LU.

6. The disk any device according to claim 1, wherein the control information stored in said systmm LU is dump information, and said dump information is backed up to said backup LU.

7. The disk any device according to claim 1, wherein the control information stored in said system LU is command device information, and said command device information is backed up to said backup LU.

8. The disk any device according to claim 1, wherein the control information stored in said system LU is fault information, and said fault information is backed up to said backup LU.

9. The disk any device according to claim 1, wherein the control information stored in said system LU is duster-shared information, and said cluster-shared information is backed up to said backup LU.

10. A controlling method of a disk array device, said disk array device comprising:

a plurality of storage devices for storing data:

a storage device control unit for controlling a data write or read operation to said plurality of storage devices;

a connection portion connected to said storage device control unit;

a plurality of channel control portions for receiving a write or read request from an external host device, converting file-level data sent from said host device into block-level data, and transferring it to said plurality of storage devices;

a cache memory temporarily saving data exchanged between said plurality of channel control portions and said storage device control unit; and a management terminal for setting a logical configuration of said plurality of storage devices, wherein, said channel control portions and said storage device control unit form, based on an instruction from said management terminal, a system LU which is a storage region for storing control information in the disk array device itself, a user LU which is a storage region for writing write data sent from said host device are settable, and a backup LU which is a storage region for backing up said control information stored in said system LU, wherein said channel control portions, said storage device control unit and said management terminal provide a function is provided to automatically define a path of said backup LU with respect to said system LU and to backup the control information stored in said system LU to said backup LU, wherein the system LU includes an OS storing LU group, a dump pick-up LU group, a command device LU group, a fault information storing LU group and a cluster-shared information storing LU group, wherein the backup LU includes a backup LU group of the OS storing LU group, a backup LU group of the cluster-shared information storing LU group, a backup LU group of the dump pick-up LU group, a backup LU group of the command device LU group and a backup LU group of the fault storing information LU group, and wherein each of the LUs of each of the LU groups of the system LU is coupled to a respective one of the control channel portions so that each of the control channel portions is coupled to a corresponding LU of one of the LU groups, and wherein deleting any one of the LUs of one of the LU groups of the system LU deletes all of the LUs of said one of the LU groups.

11. The controlling method of a disk array device according to claim 10, wherein said function to automatically define the path of said system LU is realized by said management terminal and said plurality of channel control portions, said management terminal assigns said system LU of which a path definition is desired, to a settable LDEV of a plurality of LDEVs, and said plurality of channel control portions each define automatically a path of said system LU with respect to said backup LU of said settable LDEV assigned by said management terminal.

12. The controlling method of a disk array device according to claim 10, wherein said function to automatically define the path of said system LU is realized by said plurality of channel control portions, and said plurality of channel control portions each assign said system LU for which a path definition is desired, to a settable LDEV of a plurality of LDEVs, and define automaticafly a path of said systani LU with respect to said backup LU of said seumble LDEV assigned.

13. The controlling method of a disk array device according to claim 10, wherein said function to automatically define the path of said systsm LU is realized by said management terminal, and said management tarminal assigns said systam LU for which a path definition is desired, to a settable LDEV of a plurailty of LDEVs, and defines automatically a path of said systmm LU with respect to said backup LU of said settable LDEV asslgned.

14. The controlling method of a disk any device according to claim 10, wherein the control information stored in said system LU is OS information, and said OS information is backed up to said backup LU.

15. The controlling method of a disk array device according to claim 10,
   wherein the control information stored in said system LU is dump information, and
   said dump information is backed up to said backup LU.

16. The controlling method of a disk array device according to claim 10,
   wherein the control information stored in said system LU is command device information, and
   said command device information is backed up to said backup LU.

17. The controlling method of a disk array device according to claim 10,
   wherein the control information stored in said system LU is fault information, and
   said fault information is backed up to said backup LU.

18. The controlling method of a disk array device according to claim 10,
   wherein the control information stored in said system LU is cluster-shared information, and
   said cluster-shared information is backed up to said backup LU.

19. The disk array device according to claim 1, wherein said management terminal has a function to specify said system LU and said user LU in order to set a path definition with respect to a plurality of LDEVs.

20. The disk array device according to claim 10, wherein said management terminal has a function to specify said system LU and said user LU in order to set a path definition with respect to a plurality of LDEVs.

* * * * *